(12) United States Patent
Ohwada et al.

(10) Patent No.: US 11,105,486 B2
(45) Date of Patent: Aug. 31, 2021

(54) OPTIC AND ILLUMINATION DEVICE

(71) Applicant: NGK INSULATORS, LTD., Nagoya (JP)

(72) Inventors: Iwao Ohwada, Nagoya (JP); Jungo Kondo, Miyoshi (JP); Yoshimasa Kobayashi, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 16/983,311

(22) Filed: Aug. 3, 2020

(65) Prior Publication Data

US 2020/0363037 A1 Nov. 19, 2020

Related U.S. Application Data

(63) Continuation of application No. PCT/JP2018/005702, filed on Feb. 19, 2018.

(51) Int. Cl.
*F21V 5/00* (2018.01)
*F21S 41/16* (2018.01)
*F21S 41/20* (2018.01)
*F21Y 115/30* (2016.01)

(52) U.S. Cl.
CPC .............. *F21V 5/002* (2013.01); *F21S 41/16* (2018.01); *F21S 41/285* (2018.01); *F21Y 2115/30* (2016.08)

(58) Field of Classification Search
CPC .......... F21V 5/002; F21S 41/16; F21S 41/285
USPC ....................................................... 362/259
See application file for complete search history.

(56) References Cited

U.S. PATENT DOCUMENTS

| | | | | |
|---|---|---|---|---|
| 7,122,129 | B2* | 10/2006 | Yagi ................... | C09K 11/7774 |
| | | | | 252/301.4 F |
| 9,631,793 | B2* | 4/2017 | Hikmet ................. | B82Y 30/00 |
| 9,772,071 | B2* | 9/2017 | Van Bommel ...... | H01L 25/0753 |
| 10,109,309 | B1* | 10/2018 | Jubert ...................... | G11B 5/49 |
| 10,914,444 | B2* | 2/2021 | Toko ...................... | F21S 41/285 |
| 2002/0155944 | A1* | 10/2002 | Kurashina ............. | C04B 35/632 |
| | | | | 501/153 |

(Continued)

FOREIGN PATENT DOCUMENTS

JP 3234790 A 10/1991
JP 2002293609 A 10/2002

(Continued)

OTHER PUBLICATIONS

International Search Report with English Translation issued in corresponding International Application No. PCT/JP2018/005702 dated May 22, 2018 (5 pages).

(Continued)

*Primary Examiner* — Bryon T Gyllstrom
(74) *Attorney, Agent, or Firm* — Flynn Thiel, P.C.

(57) ABSTRACT

An optic converts wavelength of light from a light source. The optic includes a first substrate and a second substrate. The first substrate includes a fluorescent material substrate. The second substrate supports the first substrate. The second substrate includes a translucent substrate to receive the light from the light source through the first substrate. The translucent substrate has an oriented polycrystalline structure to have a crystalline anisotropy in refractive index.

18 Claims, 20 Drawing Sheets

(56) References Cited

U.S. PATENT DOCUMENTS

2012/0001204 A1* 1/2012 Jagt ...................... H01L 33/504
                                                                257/88
2013/0058114 A1   3/2013 Reiners
2020/0363037 A1* 11/2020 Ohwada ................... F21V 5/10

FOREIGN PATENT DOCUMENTS

| JP | 2012521066 A | 9/2012 |
|----|--------------|--------|
| JP | 201663163 A  | 4/2016 |
| JP | 2016119361 A | 6/2016 |
| WO | 2011141377 A1 | 11/2011 |

OTHER PUBLICATIONS

Written Opinion of International Searching Authority issued in corresponding International Application No. PCT/JP2018/005702 dated May 22, 2018 (4 pages).

* cited by examiner

F I G. 1 4
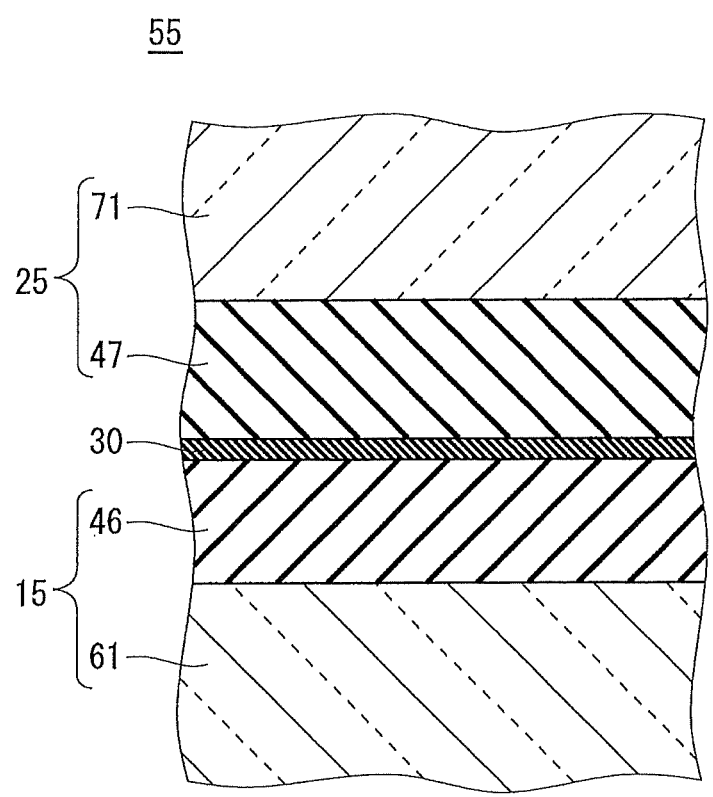

F I G. 1 7
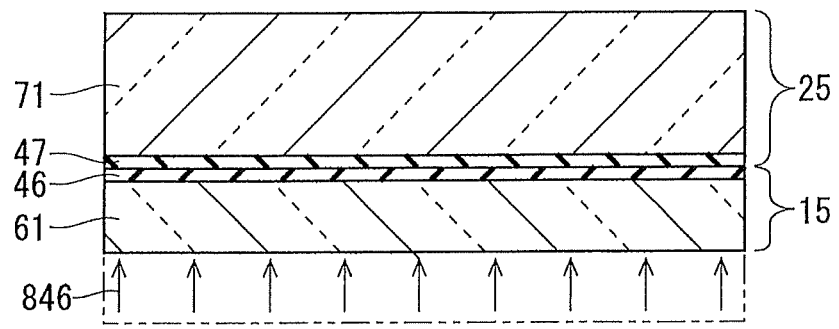

F I G. 1 9
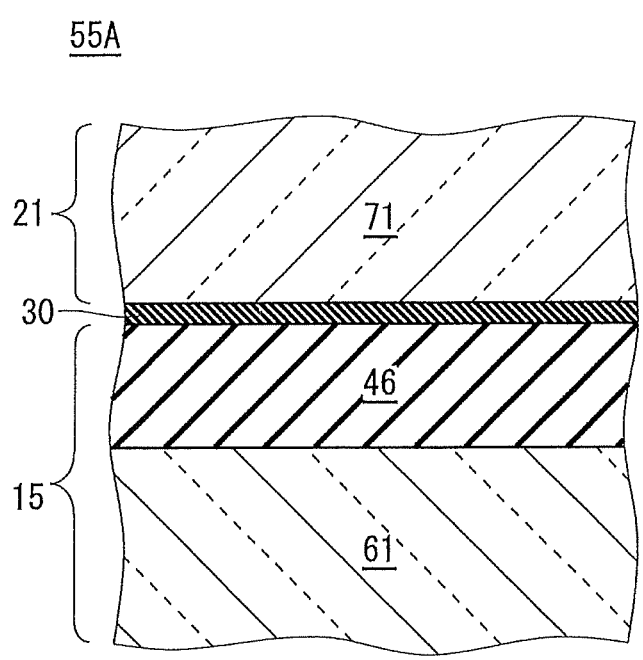

OPTIC AND ILLUMINATION DEVICE

CROSS-REFERENCE TO RELATED APPLICATIONS

This is a continuation of PCT/JP2018/005702, filed Feb. 19, 2018, the entire contents of which is hereby incorporated by reference.

TECHNICAL FIELD

The present invention relates to optics and illumination devices and, in particular, to an optic including a fluorescent material substrate and an illumination device including the optic.

BACKGROUND ART

WO 2011/141377 (Patent Document 1) discloses a headlight module for vehicles including a carrier to carry a fluorescent material and a radiation source to emit electromagnetic radiation onto the fluorescent material. Polycrystalline alumina ceramic or sapphire is shown as an example of the carrier. These materials are suitable, in terms of their high heat resistance and high thermal conductivity, for application to headlights as illumination devices likely to cause an increase in temperature and non-uniformity of temperature distribution. Cerium (Ce)-doped yttrium aluminum garnet (YAG) is shown as an example of the fluorescent material. A blue light emitting laser is shown as an example of the radiation source. Blue laser light passes through a yellow fluorescent material, and is converted into white light by the complementary color. The headlight module can thereby radiate white light.

Japanese Patent Application Laid-Open No. 2016-119361 (Patent Document 2) discloses a light emitting device including a fluorescent material as a wavelength conversion member. As the fluorescent material, a fluorescent material in the form of a powder dispersed in a binder can be used. It is also disclosed that a single monocrystalline fluorescent material or a single polycrystalline fluorescent material can be used in place of the fluorescent material in the form of the powder, and, in this case, an effect of eliminating light scattering caused by a difference in refractive index between the fluorescent material and the binder at an interface between them can be obtained.

PRIOR ART DOCUMENTS

Patent Documents

Patent Document 1: WO 2011/141377
Patent Document 2: Japanese Patent Application Laid-Open No. 2016-119361

SUMMARY

Problem to be Solved by the Invention

In a light emitting device (an illumination device), moderate light scattering is sometimes desired. In a case of a headlight using a blue laser as a light source, for example, if light scattering is extremely low, not white light but bluish light is radiated intensely along a direction of travel of blue laser light having been not scattered. Illumination light from the headlight thus has strong color non-uniformity. On the other hand, if light scattering is extremely high, attenuation of light increases to reduce output of the illumination light.

The degree of light scattering varies depending on whether a fluorescent material is a fluorescent material dispersed in a binder, a polycrystalline fluorescent material, or a monocrystalline fluorescent material. Specifically, the degree of light scattering is high in a case of the fluorescent material dispersed in the binder, is moderate in a case of the polycrystalline fluorescent material, and is low in a case of the monocrystalline fluorescent material. Selection of any of these three types of fluorescent materials is not necessarily possible. For example, the fluorescent material dispersed in the binder is likely to be reduced in internal quantum efficiency at high temperature, and, particularly in a case where the binder is organic matter, the binder is likely to be deteriorated. An illumination device having a high luminance, such as a headlight and a light source for a projector, is likely to cause an increase in temperature, and thus the fluorescent material dispersed in the binder is sometimes inappropriate for the above-mentioned reason. On the other hand, reduction in internal quantum efficiency of the monocrystalline fluorescent material is relatively small even at a high temperature of approximately 300° C. The use of the monocrystalline fluorescent material in high luminance applications is thus considered. The monocrystalline fluorescent material, however, is typically manufactured by pulling, and thus has disadvantages in that manufacture of a large crystal is difficult and the concentration of an added activator varies in a vertical direction of a crystal. On the other hand, a polycrystalline material, such as ceramic, is easily increased in size, and is less likely to cause the variation in concentration of the added activator. A polycrystalline fluorescent material having temperature characteristics and transmission characteristics equivalent to those of the monocrystalline fluorescent material has recently been proposed. The type of the fluorescent material is required to be selected in view of these situations, and it is difficult to adjust the degree of light scattering through selection of the type of the fluorescent material.

In a case where light passes through not only the fluorescent material but also a carrier thereof, light is scattered not only in the fluorescent material but also in the carrier to mechanically hold the fluorescent material. The degree of light scattering as a whole can be optimized by sufficiently adjusting the degree of light scattering in the carrier even if the degree of light scattering in the fluorescent material cannot sufficiently be adjusted. In conventional technology, however, there are generally only two options for the carrier: a polycrystalline carrier in which light is highly scattered or a monocrystalline carrier in which light is less scattered. In the former case, attenuation of light increases to reduce output of the illumination light. In the latter case, color non-uniformity becomes strong because light having traveled straight from a light source without having undergone wavelength conversion maintains a high directivity. It is thus difficult to obtain illumination light having high output and low color non-uniformity at the same time.

The present invention is conceived to solve the above-mentioned problem, and it is one object of the present invention to provide an optic to obtain an illumination device capable of generating illumination light having high output and low color non-uniformity. It is another object to provide the illumination device capable of generating the illumination light having high output and low color non-uniformity.

Means to Solve the Problem

An optic of the present invention converts wavelength of light from a light source. The optic includes a first substrate and a second substrate. The first substrate includes a fluorescent material substrate. The second substrate supports the first substrate. The second substrate includes a translucent substrate to receive light from the light source through the first substrate. The translucent substrate has an oriented polycrystalline structure to have a crystalline anisotropy in refractive index.

An illumination device of the present invention includes a light source and an optic. The optic coverts wavelength of light from the light source. The optic includes a first substrate and a second substrate. The first substrate includes a fluorescent material substrate. The second substrate supports the first substrate. The second substrate includes a translucent substrate to receive the light from the light source through the first substrate. The translucent substrate has an oriented polycrystalline structure to have a crystalline anisotropy in refractive index.

In the present description, the term "fluorescent material" can refer to not only a fluorescent material in a narrow sense but also a phosphorescent material or a scintillator.

Effects of the Invention

According to the present invention, light from the fluorescent material substrate passes through the translucent substrate. The translucent substrate has the oriented polycrystalline structure to have the crystalline anisotropy in refractive index. Light having traveled straight from the fluorescent material substrate can thereby moderately be scattered without being excessively absorbed. Illumination light having high output and low color non-uniformity can thus be generated.

The objects, features, aspects, and advantages of the present invention will become more apparent from the following detailed description and the accompanying drawings.

BRIEF DESCRIPTION OF DRAWINGS

FIG. 14 is an enlarged view of a portion of FIG. 13, and is a partial sectional view schematically showing a boundary between a first substrate and a second substrate and a region around the boundary.

FIG. 17 is a sectional view schematically showing a third step in the method of manufacturing the optic in FIG. 13.

FIG. 19 is a partial sectional view schematically showing a configuration of an optic in a first modification of Embodiment 5 of the present invention in a similar view to that of FIG. 14.

DESCRIPTION OF EMBODIMENTS

Figure 1:
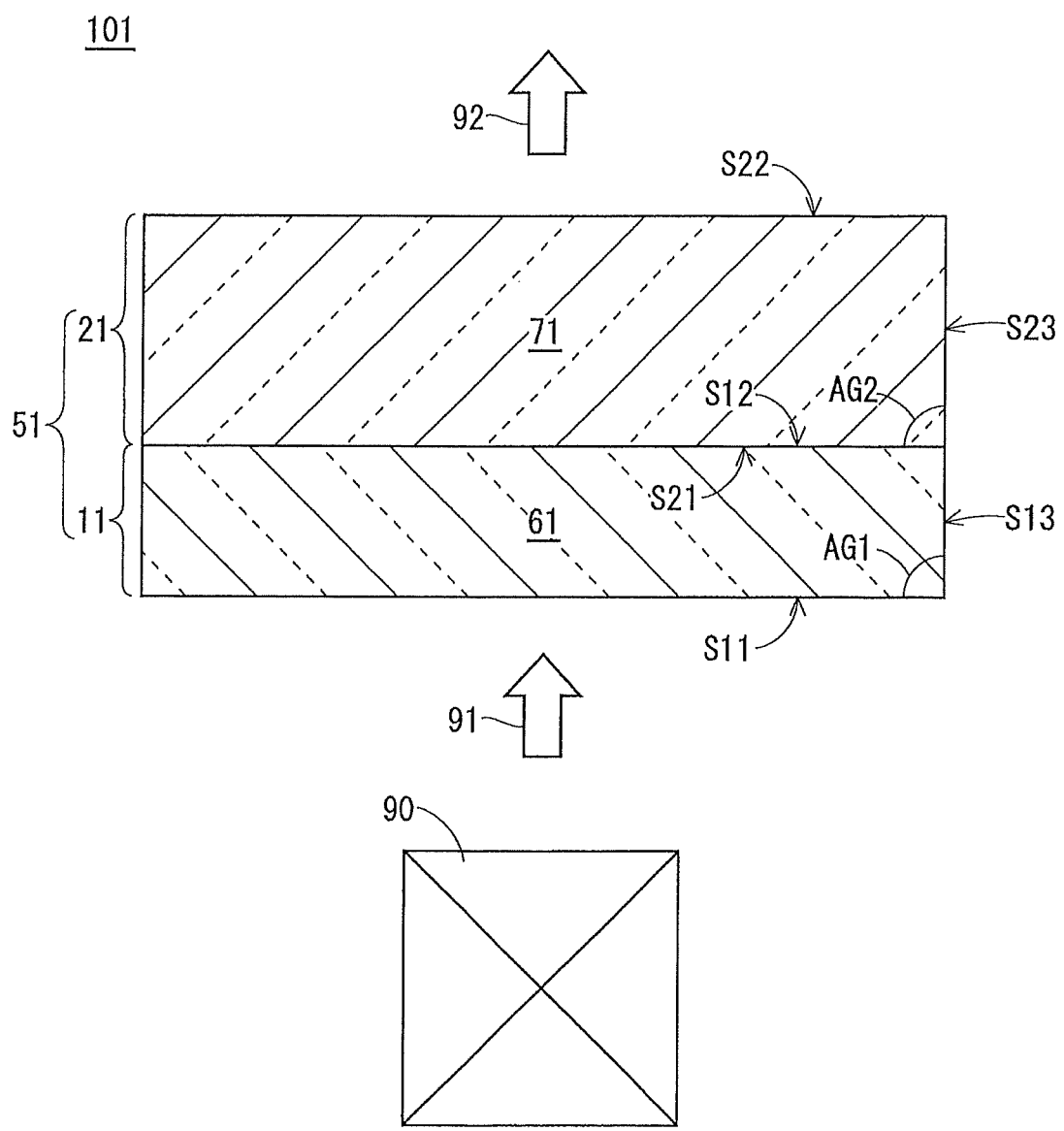
FIG. 1 is a sectional view schematically showing a configuration of an illumination device including an optic in Embodiment 1 of the present invention.

Embodiments of the present invention will be described below based on the drawings. The same components or equivalent components in the drawings bear the same reference sign, and description thereof is not repeated below.

Embodiment 1

(Configuration)

FIG. 1 is a sectional view schematically showing a configuration of an illumination device 101 including an optic 51 in Embodiment 1. The shape of the illumination device 101 in plan view is not particularly limited, and is polygonal or circular, for example. As the polygonal shape, a quadrilateral shape is typically used, and a square shape is used, for example.

The illumination device 101 includes a light source 90 and the optic 51. The optic 51 converts wavelength of excitation light 91 from the light source 90, and is namely a wavelength conversion member. The excitation light 91 generated by the light source 90 passes through the optic 51 to be converted into illumination light 92. For example, the excitation light 91 is blue light or ultraviolet light, and the illumination light 92 is white light (a combination of blue light as transmitted light of the excitation light 91 and yellow light having wavelength converted by a fluorescent material).

The light source 90 generates light having a sharp directivity, and typically includes a laser. The light source 90 is, for example, a semiconductor laser to generate blue light or ultraviolet light.

The optic 51 includes a first substrate 11 and a second substrate 21 to support the first substrate 11. The illumination light 92 is generated by the excitation light 91 passing through the first substrate 11 and the second substrate 21 in this order. The first substrate 11 includes a fluorescent material substrate 61, and, in the present embodiment, the first substrate 11 is the fluorescent material substrate 61. The second substrate 21 includes a translucent substrate 71, and, in the present embodiment, the second substrate 21 is the translucent substrate 71. The translucent substrate 71 receives the excitation light 91 from the light source 90 through the first substrate 11.

The fluorescent material substrate 61 has an entrance surface S11, an exit surface S12 opposite the entrance surface S11, and a side surface S13 to connect the entrance surface S11 and the exit surface S12 to each other. The side surface S13 has an angle AG1 from the entrance surface S11. In the present embodiment, the angle AG1 is not particularly limited, and may be a right angle (i.e., approximately 90°). The side surface S13 may be exposed as illustrated. The entrance surface S11 receives the excitation light 91 from the light source 90. The exit surface S12 radiates light to the translucent substrate 71. The entrance surface S11 of the fluorescent material substrate 61 may be exposed as illustrated.

The translucent substrate 71 has an entrance surface S21, an exit surface S22 opposite the entrance surface S21, and a side surface S23 to connect the entrance surface S21 and the exit surface S22 to each other. The side surface S23 has an angle AG2 from the entrance surface S21. In the present embodiment, the angle AG2 is not particularly limited, and may be a right angle (i.e., approximately 90°). The side surface S23 may be exposed as illustrated. The entrance surface S21 receives light from the light source 90 through the first substrate 11. In the present embodiment, the entrance surface S21 of the translucent substrate 71 is joined to the exit surface S12 of the fluorescent material substrate 61. It can be joined, for example, using technology of so-called direct joining. The exit surface S22 radiates the illumination light 92.

The translucent substrate 71 is a ceramic (sintered body). The translucent substrate 71 has an oriented polycrystalline structure to have a crystalline anisotropy in refractive index. An orientation direction is preferably along a thickness direction of the translucent substrate 71 (a vertical direction in FIG. 1). In other words, the orientation direction is preferably along a direction in which the first substrate 11 and the second substrate 21 are stacked. The crystalline anisotropy in refractive index is preferably 0.3% or more, and may be 1% or more to sufficiently enhance a light scattering effect. The crystalline anisotropy is herein expressed as a percentage of a difference between a maximum refractive index and a minimum refractive index depending on an orientation relative to the maximum refractive index. The translucent substrate 71 is preferably made of aluminum nitride or aluminum oxide (alumina: $Al_2O_3$) to easily secure the above-mentioned crystalline anisotropy. An orientation axis of crystals is typically a c-axis in crystallography. A main component (e.g., aluminum nitride or aluminum oxide) of the translucent substrate 71 preferably accounts for 99% or more, and more preferably accounts for 99.99% or more of all the components of the translucent substrate 71. As for aluminum nitride and aluminum oxide (sapphire), the relationship between a crystallographic axis and the refractive index at a wavelength of 600 nm is shown for reference in a table below.

TABLE 1

| CRYSTALLOGRAPHIC AXIS | REFRACTIVE INDEX (600 nm) | |
|---|---|---|
| | SAPPHIRE | ALUMINUM NITRIDE |
| a-AXIS | 1.759 | 2.17 |
| c-AXIS | 1.765 | 2.23 |

The polycrystalline structure of the translucent substrate 71 has a degree of orientation of 10% or more and 99.5% or less. The degree of orientation is preferably 10% or more and 99% or less, and is typically 30% or more and 85% or less. The degree of orientation of the translucent substrate 71 can be controlled by adjusting manufacturing conditions of the translucent substrate 71. In-line transmittance of the translucent substrate 71 can be controlled by adjusting the degree of orientation. The in-line transmittance of the translucent substrate 71 is preferably 99.5% or less between the entrance surface S21 and the exit surface S22, and, specifically, may be adjusted to have a desired value in accordance with the application of the illumination device 101. The relationship between the degree of orientation and the in-line transmittance obtained experimentally using an aluminum nitride substrate having a thickness of 0.22 mm is shown in a table below.

TABLE 2

| | IN-LINE TRANSMITTANCE [%] | |
|---|---|---|
| DEGREE OF ORIENTATION [%] | IN CASE WHERE ABSORPTION (WAVELENGTH OF 600 nm) IS 0% | IN CASE WHERE ABSORPTION (WAVELENGTH OF 600 nm) IS 30% |
| 99 | 80 | 56 |
| 70 | 30 | 21 |
| 50 | 15 | 10 |
| 30 | 8 | 5 |

As shown in the above-mentioned table, the in-line transmittance is affected by Fresnel reflection between the entrance surface S21 and the exit surface S22, and is dependent on light absorption of the translucent substrate 71. The absorption is preferably 30% or less between the entrance surface S21 and the exit surface S22. The translucent substrate 71 preferably has a relative density of 99.1% or more. The amount of transition metal contained in the translucent substrate 71 is preferably 200 ppm or less.

The fluorescent material substrate 61 preferably has a polycrystalline structure. The fluorescent material substrate 61 preferably does not substantially contain any binder, such as glass and resin, to prevent reduction in conversion efficiency due to an increase in temperature. That is to say, the fluorescent material substrate 61 is preferably not configured by combining many fluorescent material particles by a binder but configured so that the polycrystalline structure itself is provided to be continuous, and typically a ceramic. The fluorescent material substrate 61 is, for example, made of YAG doped with an added activator, such as Ce.

When the fluorescent material substrate 61 and the translucent substrate 71 are compared with each other, the translucent substrate 71 preferably has a higher refractive index than the fluorescent material substrate 61. A coefficient of linear expansion of the translucent substrate 71 is preferably within ±50% of that of the fluorescent material substrate 61. Furthermore, the translucent substrate 71 preferably has a higher thermal conductivity than the fluorescent material substrate 61. Specifically, the translucent substrate 71 preferably has a thermal conductivity of 30 W/mK or more, and more preferably has a thermal conductivity of 100 W/mK or more in terms of sufficiently increasing heat dissipation.

(Effects)

According to the present embodiment, light from the fluorescent material substrate 61 passes through the translucent substrate 71. The translucent substrate 71 has the oriented polycrystalline structure to have the crystalline anisotropy in refractive index. Light having traveled straight from the fluorescent material substrate 61 can thereby moderately be scattered without being excessively absorbed. The illumination light 92 having high output and low color non-uniformity can thus be generated.

In a case where the light source 90 is a laser, the excitation light 91 has a strong directivity, and thus is likely to travel straight in the fluorescent material substrate 61. The above-mentioned effect can thus more prominently be obtained.

The translucent substrate 71 is made of aluminum nitride or aluminum oxide. The polycrystalline structure significantly having the crystalline anisotropy in refractive index can thereby easily be obtained.

In a case where the polycrystalline structure of the translucent substrate 71 has a degree of orientation of 10% or more and 99.5% or less, an excessively high or excessively low in-line transmittance of the translucent substrate 71 can be avoided. In a case where the degree of orientation is 99.5% or less, significant light scattering can be caused in the translucent substrate 71. In a case where the translucent substrate 71 has a higher refractive index than the fluorescent material substrate 61, light is less likely to escape from the side surface S23 of the translucent substrate 71. In a case where the translucent substrate 71 has an absorption of 30% or less between the entrance surface S21 and the exit surface S22, excessive absorption of light in the translucent substrate 71 can be avoided.

The illumination light 92 is radiated from the translucent substrate 71 after passing through the fluorescent material substrate 61. The directivity of the illumination light 92 can thus easily be controlled by the design of the translucent substrate 71. Specifically, the directivity of the illumination light 92 can be controlled by the design of the side surface S23.

Since the first substrate 11 and the second substrate 21 are connected to each other, emission of heat generated due to wavelength conversion in the fluorescent material substrate 61 can be promoted. Deterioration of performance of the fluorescent material substrate 61 caused by the increase in temperature can thus be suppressed. In a case where the translucent substrate 71 has a higher thermal conductivity than the fluorescent material substrate 61, this effect is further enhanced. In terms of enhancing the thermal conductivity of the translucent substrate 71, the degree of orientation is preferably high, and may be 90% or more, for example.

Since the first substrate 11 and the second substrate 21 are connected to each other, the illumination device 101 can be reduced in size compared with a case where the first substrate 11 and the second substrate 21 are separated from each other via a space. The number of interfaces between the first substrate 11 and the second substrate 21 is reduced, so that a propagation loss due to interfacial reflection can be suppressed.

In a case where the coefficient of linear expansion of the translucent substrate 71 is within ±50% of that of the fluorescent material substrate 61, cracking of the fluorescent material substrate 61 caused by a difference in thermal expansion can be prevented. A prominent effect can be obtained particularly in a case where there is a large difference in thickness between the fluorescent material substrate 61 and the translucent substrate 71, for example, in a case where the fluorescent material substrate 61 has a thickness of approximately 100 μm or less, and the translucent substrate 71 has a thickness of 1 mm or more.

In a case where the fluorescent material substrate 61 has the polycrystalline structure, light is moderately scattered compared with a case where the fluorescent material is a monocrystalline fluorescent material or a fluorescent material dispersed in a binder. In this case, the translucent substrate 71 can be required to moderately scatter light to cause light scattering of the fluorescent material substrate 61 and the translucent substrate 71 as a whole to be moderate. According to the present embodiment, the translucent substrate 71 has the oriented polycrystalline structure. The translucent substrate 71 can thus moderately scatter light compared with a case where the translucent substrate 71 has a monocrystalline structure or an unoriented polycrystalline structure.

The fluorescent material substrate 61 is not limited to that having the polycrystalline structure. An effect of adjusting the degree of light scattering by adjusting an orientation of the polycrystalline structure of the translucent substrate 71 can be obtained regardless of the configuration of the fluorescent material substrate 61. As a modification, the fluorescent material substrate 61 may have the monocrystalline structure. In this case, the degree of orientation of the translucent substrate 71 is reduced not to cause light scattering to be insufficient. As another modification, the fluorescent material substrate 61 may be formed through dispersion in the binder. In this case, the degree of orientation of the translucent substrate 71 is reduced not to cause light scattering to be excessive.

In a case where the angle AG2 is the right angle, a method of manufacturing the optic 51 is simplified. In a case where the entrance surface S11 of the fluorescent material substrate 61 is exposed, the configuration of the illumination device is simplified compared with a case where any member is disposed on the entrance surface S11.

(Method of Measuring Degree of Orientation)

The degree of orientation can be measured by the Lotgering method using X-ray diffraction. A measurement sample can be obtained by polishing a substantially horizontal cross section (a cross section substantially perpendicular to the thickness direction) of the translucent substrate 71 smooth. The polished surface is irradiated with an X-ray to obtain an X-ray diffraction profile. A case where the translucent substrate 71 is made of alumina will be described in details below.

When a direction of an incident X-ray and a direction of a diffraction X-ray form an angle of $2\theta$, and CuK$\alpha$ ray is used as the X-ray, the X-ray diffraction profile is obtained in a range of $2\theta = 20°$ to $70°$, for example. Data on an intensity $I_s(hkl)$ corresponding to each (hkl) plane can be read from the profile. A degree of orientation of a c-plane is calculated from the data as described below.

$$\frac{P - P_0}{1 - P_0} \times 100 \ [\%]$$

An intensity ratio $P_0$ and an intensity ratio $P$ in the above-mentioned value are calculated by the following equations:

$$P_0 = \frac{I_0(006)}{\sum I_0(hkl)}$$

$$P = \frac{I_S(006)}{\sum I_S(hkl)}$$

The intensity ratio P is obtained by normalizing, as for the measurement sample, an intensity $I_s(006)$ of a (006) plane corresponding to the c-plane by the sum of intensities $I_s(hkl)$ of all (hkl) planes in a measurement range. The intensity ratio $P_0$ is obtained by normalizing, as for unoriented alumina, an intensity $I_0(006)$ of the (006) plane corresponding to the c-plane by the sum of intensities $I_0(hkl)$ of all (hkl) planes in the measurement range. The intensity ratio $P_0$ can be calculated from Joint Committee on Powder Diffraction Standards (JCPDS) card No. 46-1212 for standard α-alumina as the unoriented alumina. "RINT-TTR III" from Rigaku Corporation can be used, for example, as an X-ray diffraction device, and a voltage of 50 kV and a current of 300 mA can be used, for example, as setting conditions of an X-ray source.

The degree of orientation of a material other than alumina, such as aluminum nitride, can be measured by a method similar to the above-mentioned method.

(Method of Adjusting Degree of Orientation)

A method of adjusting the degree of orientation will be described by taking a case of alumina as an example. Typical polycrystalline alumina is unoriented, and substantially has a degree of orientation of 0%. On the other hand, the degree of orientation of intentionally oriented polycrystalline alumina can be controlled to be approximately 1% to nearly 100%. Templated grain growth (TGG) using a raw material containing tabular alumina particles is used, for example, to obtain the orientation. The degree of orientation can optionally be adjusted by adjusting a composition ratio of the tabular alumina particles and normal alumina particles that are not tabular in the raw material. The tabular alumina particles each preferably have a particle diameter of approximately 1.5 μm or more and approximately 20 μm or less to obtain both a high degree of orientation and compactness.

(Modification)

Figure 2:
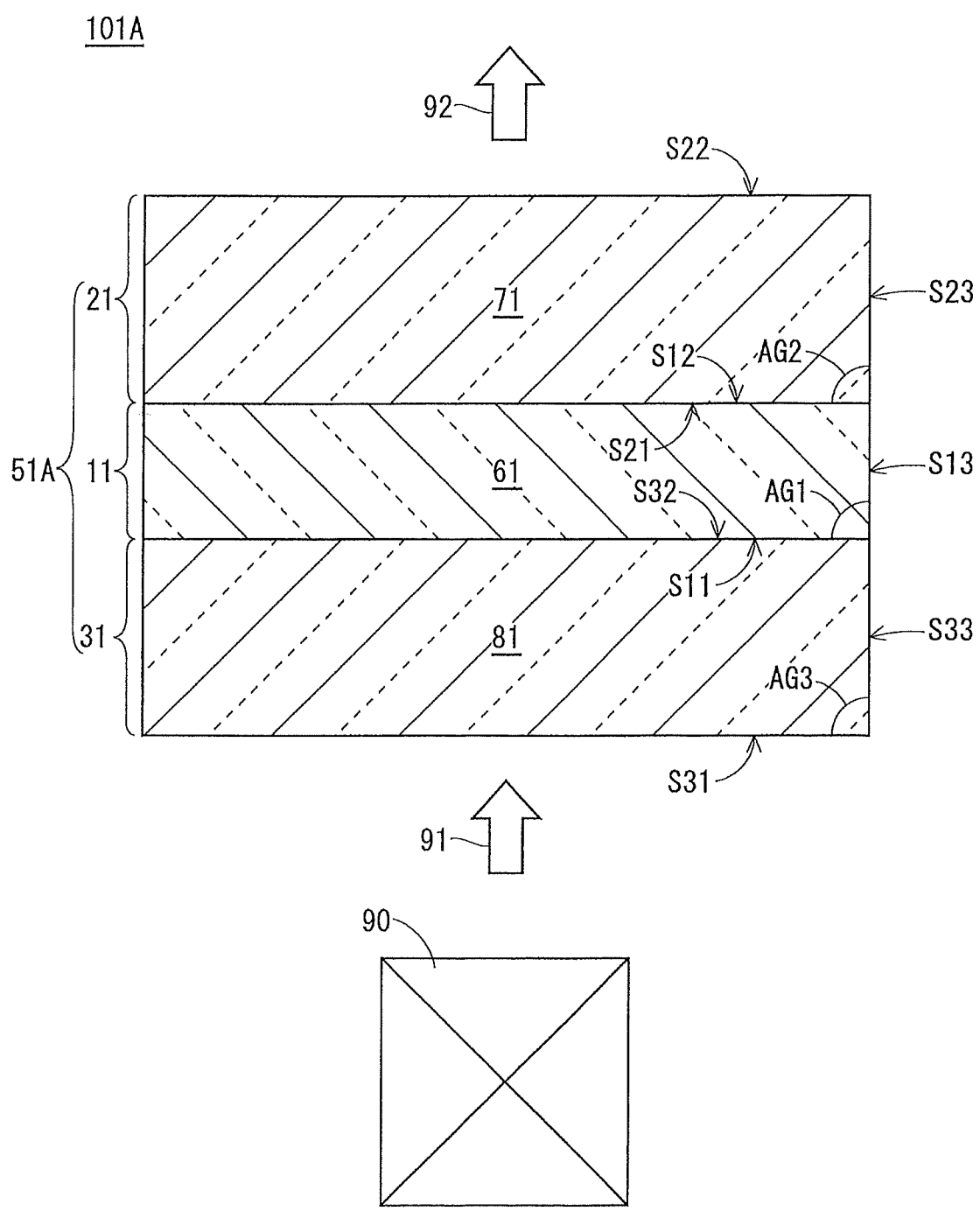
FIG. 2 is a sectional view schematically showing a configuration of an illumination device including an optic in a modification of Embodiment 1 of the present invention.

FIG. 2 is a sectional view schematically showing a configuration of an illumination device 101A including an optic 51A in a modification of Embodiment 1. The optic 51A includes a third substrate 31. The third substrate 31 supports the first substrate 11. The first substrate 11 is located between the second substrate 21 and the third substrate 31. The third substrate 31 includes a substrate 81, and is the substrate 81 in FIG. 2. The substrate 81 may be made of a material similar to the material for the translucent substrate 71.

The substrate 81 has an entrance surface S31, an exit surface S32 opposite the entrance surface S31, and a side surface S33 to connect the entrance surface S31 and the exit surface S32 to each other. The side surface S33 has an angle AG3 from the entrance surface S31. In the present embodiment, the angle AG3 is not particularly limited, and may be a right angle (i.e., approximately 90°). The side surface S33 may be exposed as illustrated. The entrance surface S31 receives the excitation light 91 from the light source 90. The exit surface S32 radiates light to the fluorescent material substrate 61. In the present embodiment, the exit surface S32 of the substrate 81 is joined to the entrance surface S11 of the fluorescent material substrate 61. It can be joined, for example, using the technology of so-called direct joining.

According to the present modification, the first substrate 11 is more securely supported. This can ease design requirements for the second substrate 21 as a support member. The degree of freedom of design of the second substrate 21 can thus be enhanced. Characteristics of the illumination light 92 can easily be optimized.

Furthermore, the third substrate 31 promotes emission of heat from the entrance surface S11 of the fluorescent material substrate 61. The increase in temperature of the fluorescent material substrate 61 can thereby be further suppressed.

Embodiment 2

Figure 3:
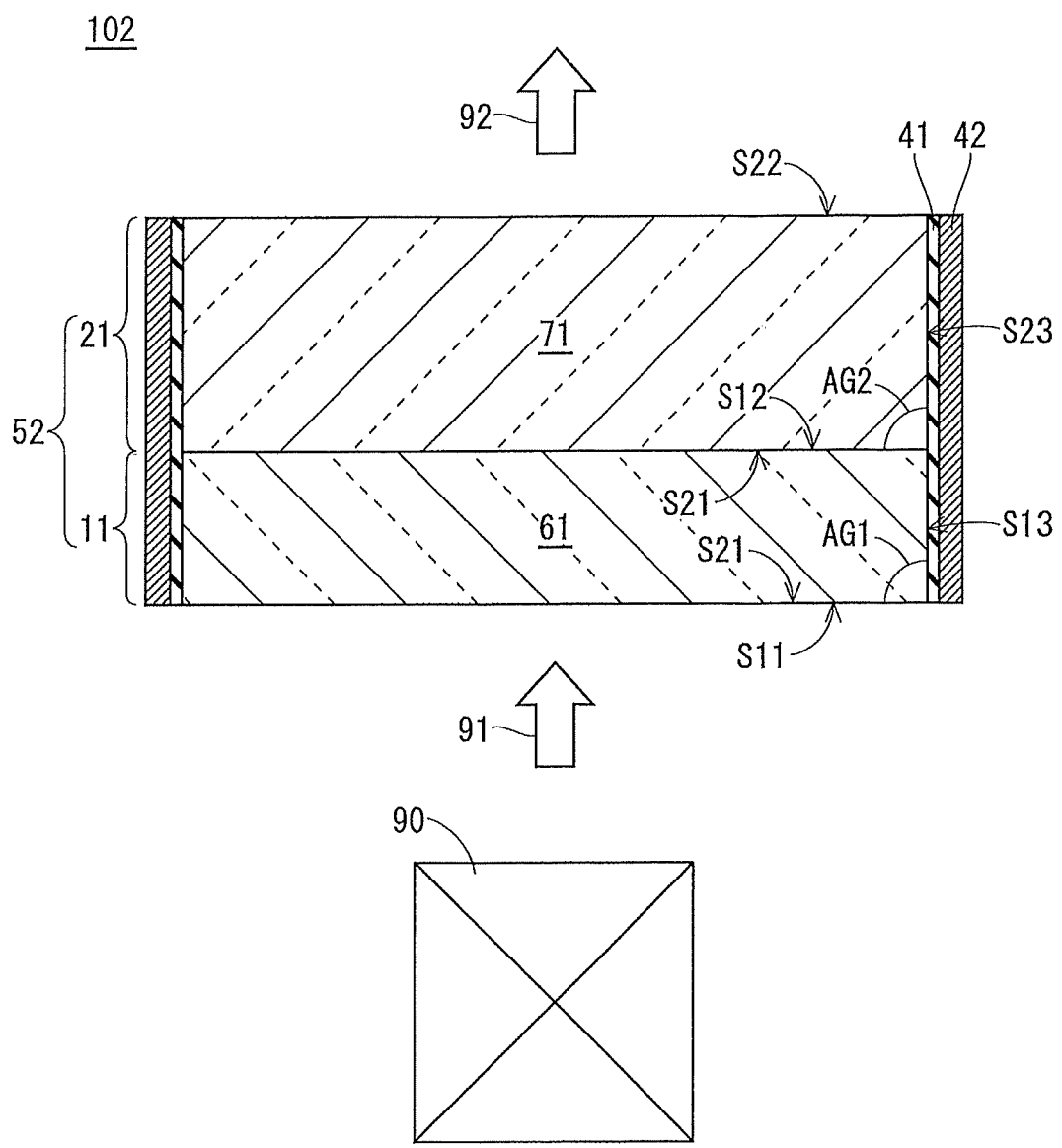
FIG. 3 is a sectional view schematically showing a configuration of an illumination device including an optic in Embodiment 2 of the present invention.

FIG. 3 is a sectional view schematically showing a configuration of an illumination device 102 including an optic 52 in Embodiment 2. In the optic 52, the side surface S23 of the translucent substrate 71 is coated. The side surface coating will be described in more details below.

The optic 52 includes a dielectric film 41. The dielectric film 41 is disposed over the side surface S23 of the translucent substrate 71. The dielectric film 41 has a lower refractive index than the translucent substrate 71. In a case where the translucent substrate 71 is made of aluminum nitride, the dielectric film 41 is made, for example, of silicon oxide or aluminum oxide. In a case where the translucent substrate 71 is made of aluminum oxide, the dielectric film 41 is made, for example, of silicon oxide.

The optic includes a reflective film 42. The reflective film 42 is disposed directly or indirectly over the side surface S23 of the translucent substrate 71, and, in the illustrated example, is disposed indirectly through the dielectric film 41. The reflective film is typically made of metal.

The dielectric film 41 or the reflective film 42 may be omitted. The above-mentioned coating may be disposed not only over the side surface S23 of the translucent substrate but also over the side surface S13 of the fluorescent material substrate 61.

According to the present embodiment, the side surface S23 of the translucent substrate 71 is coated as described above. This suppresses an escape of light from the side surface S23 of the translucent substrate 71. In a case where the side surface S13 of the fluorescent material substrate 61 is coated, an escape of light from the side surface S13 of the fluorescent material substrate 61 is suppressed. In a case where the coating includes a film made of a material having a high electrical conductivity, in particular, metal, emission of heat from the side surface S13 of the fluorescent material substrate 61 is promoted. The increase in temperature of the fluorescent material substrate 61 can thereby be further suppressed.

Figure 4:
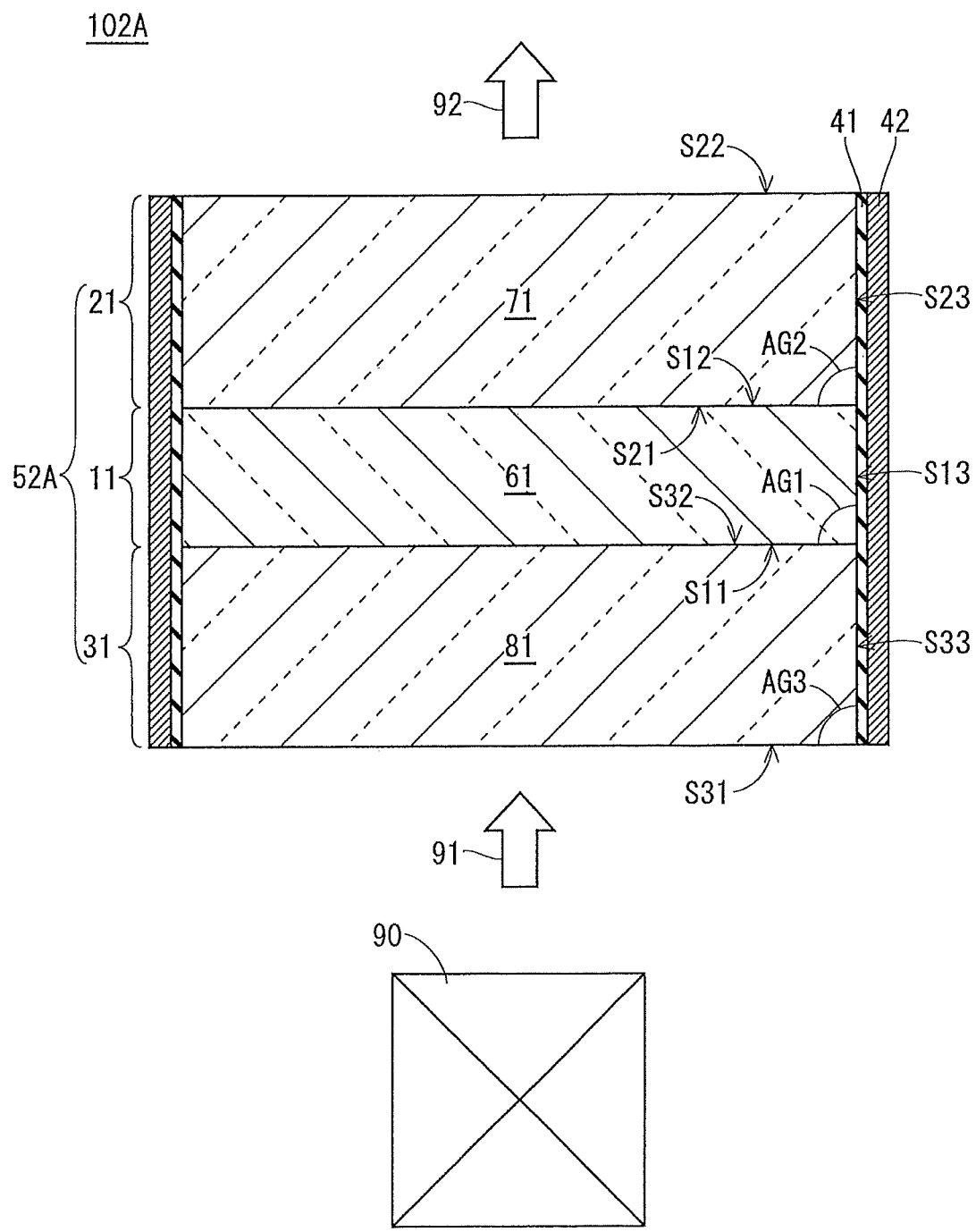
FIG. 4 is a sectional view schematically showing a configuration of an illumination device including an optic in a modification of Embodiment 2 of the present invention.

FIG. 4 is a sectional view schematically showing a configuration of an illumination device 102A including an optic 52A in a modification of Embodiment 2. The optic 52A includes the third substrate 31 including the substrate 81 as in the modification (FIG. 2) of Embodiment 1. An effect similar to the effect obtained in the modification of Embodiment 1 can thereby be obtained. The above-mentioned coating may be disposed over the side surface S33 of the substrate 81. This suppresses an escape of light from the side surface S33 of the substrate 81.

Embodiment 3

Figure 5:
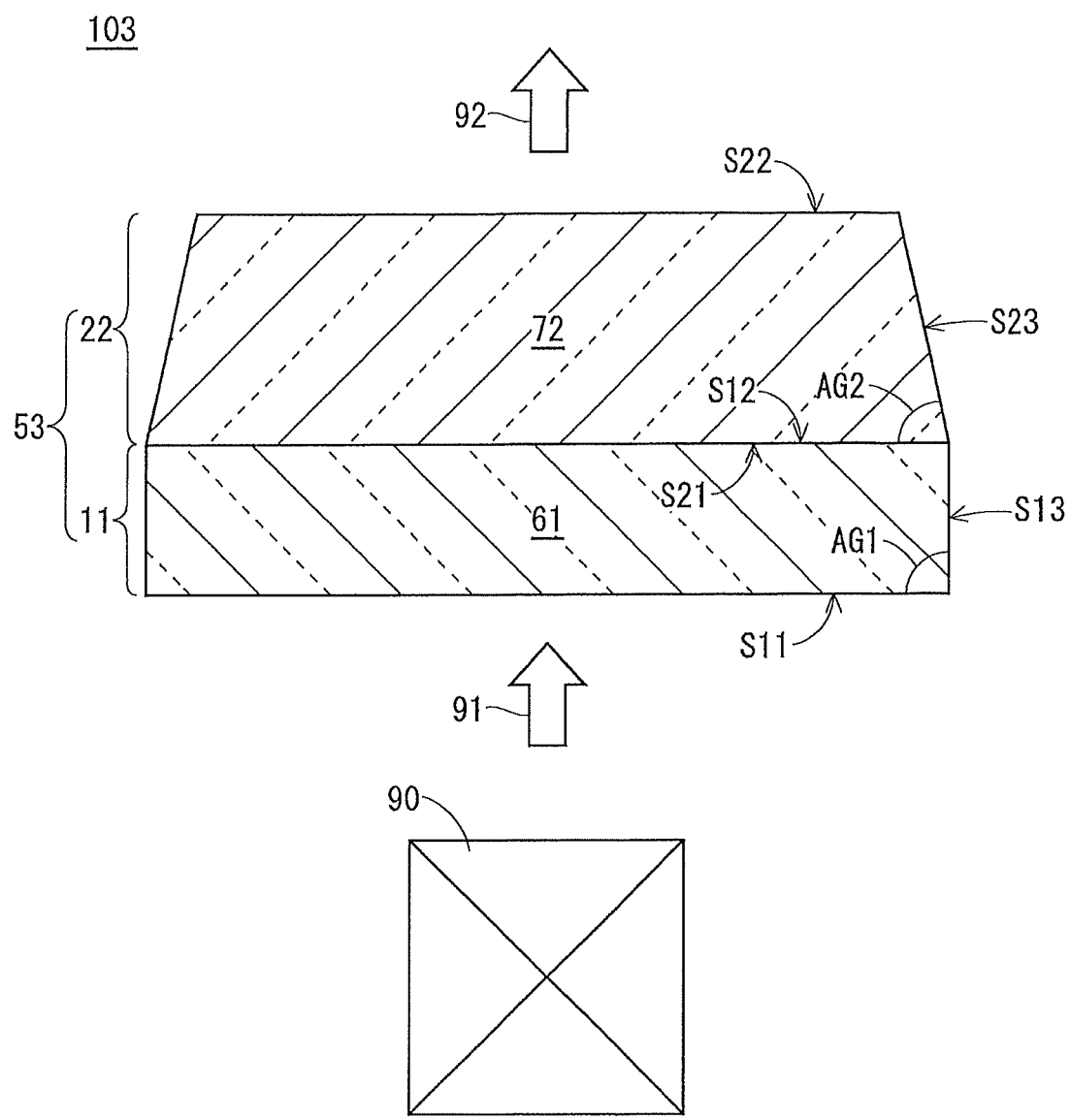
FIG. 5 is a sectional view schematically showing a configuration of an illumination device including an optic in Embodiment 3 of the present invention.

FIG. 5 is a sectional view schematically showing a configuration of an illumination device 103 including an optic 53 in Embodiment 3. The optic 53 includes a second substrate 22 in place of the second substrate 21 (FIG. 1: Embodiment 1). The second substrate 22 includes a translucent substrate 72 in place of the translucent substrate 71 (FIG. 1: Embodiment 1). As for the translucent substrate 72, the exit surface S22 is different from the entrance surface S21 in area. Specifically, the exit surface S22 has a smaller area than the entrance surface S21. At least portion of the side surface S23 has the angle AG2 smaller than the right angle from the entrance surface S21. In other words, $0°<AG2<90°$ is satisfied. It is preferable that $AG2 \geq 45°$ be satisfied.

Configurations of the second substrate 22 and the translucent substrate 72 other than the above-mentioned configuration are similar to those of the second substrate 21 and the translucent substrate 71 described in Embodiment 1. According to the present embodiment, the illumination light 92 can be focused by using the translucent substrate 72 compared with a case where the translucent substrate 71 is used.

Figure 6:
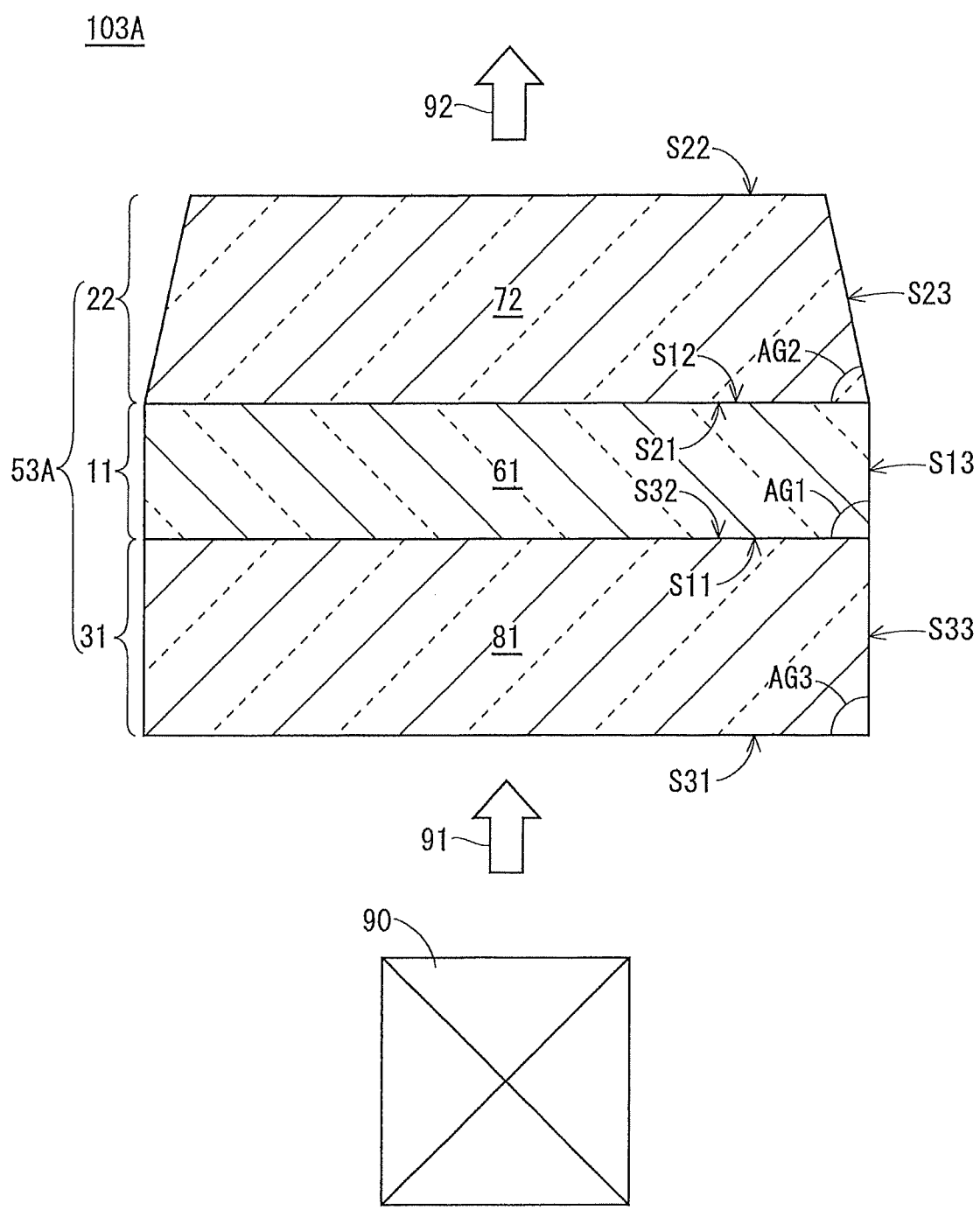
FIG. 6 is a sectional view schematically showing a configuration of an illumination device including an optic in a first modification of Embodiment 3 of the present invention.

FIG. 6 is a sectional view schematically showing a configuration of an illumination device 103A including an optic 53A in a first modification of Embodiment 3. The optic 53A includes the third substrate 31 including the substrate 81 as in the modification of Embodiment 1 shown in FIG. 2. An effect similar to the effect obtained in the modification of Embodiment 1 can thereby be obtained.

Figure 7:
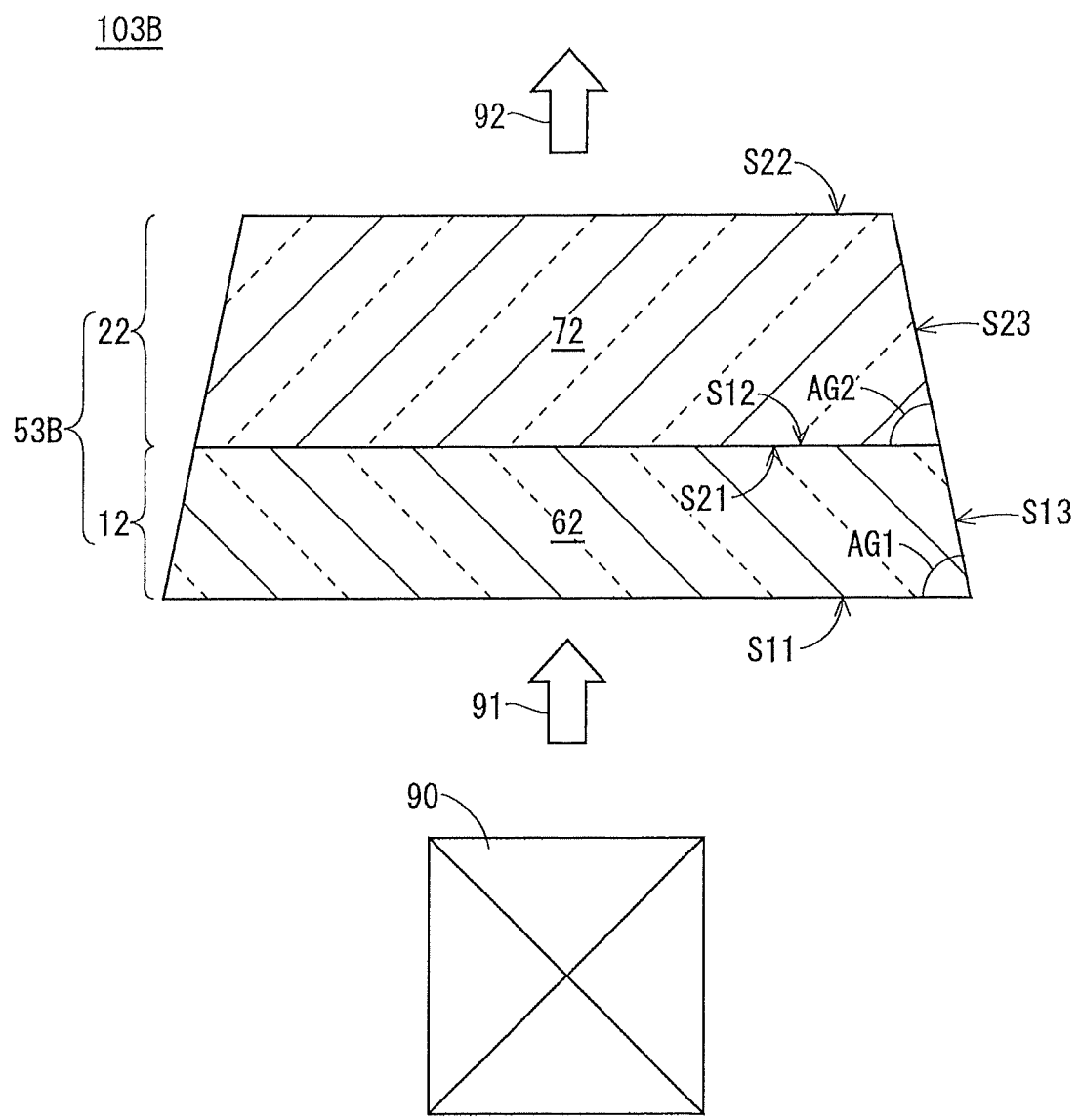
FIG. 7 is a sectional view schematically showing a configuration of an illumination device including an optic in a second modification of Embodiment 3 of the present invention.

FIG. 7 is a sectional view schematically showing a configuration of an illumination device 103B including an optic 53B in a second modification of Embodiment 3. The optic 53B includes a first substrate 12 in place of the first substrate 11 (FIG. 5). The first substrate 12 includes a fluorescent material substrate 62 in place of the fluorescent material substrate 61 (FIG. 5). As for the fluorescent material substrate 62, the exit surface S12 is different from the entrance surface S11 in area. Specifically, the exit surface S12 has a smaller area than the entrance surface S11. At least portion of the side surface S13 has the angle AG1 smaller than the right angle from the entrance surface S11. In other words, $0°<AG1<90°$ is satisfied. It is preferable that $AG1 \geq 45°$ be satisfied. The angle AG1 may be the same as the angle AG2 to facilitate processing. Configurations of the first substrate 12 and the fluorescent material substrate 62 other than the above-mentioned configuration are similar to those of the first substrate 11 and the fluorescent material substrate 61 described in Embodiment 1.

Figure 8:
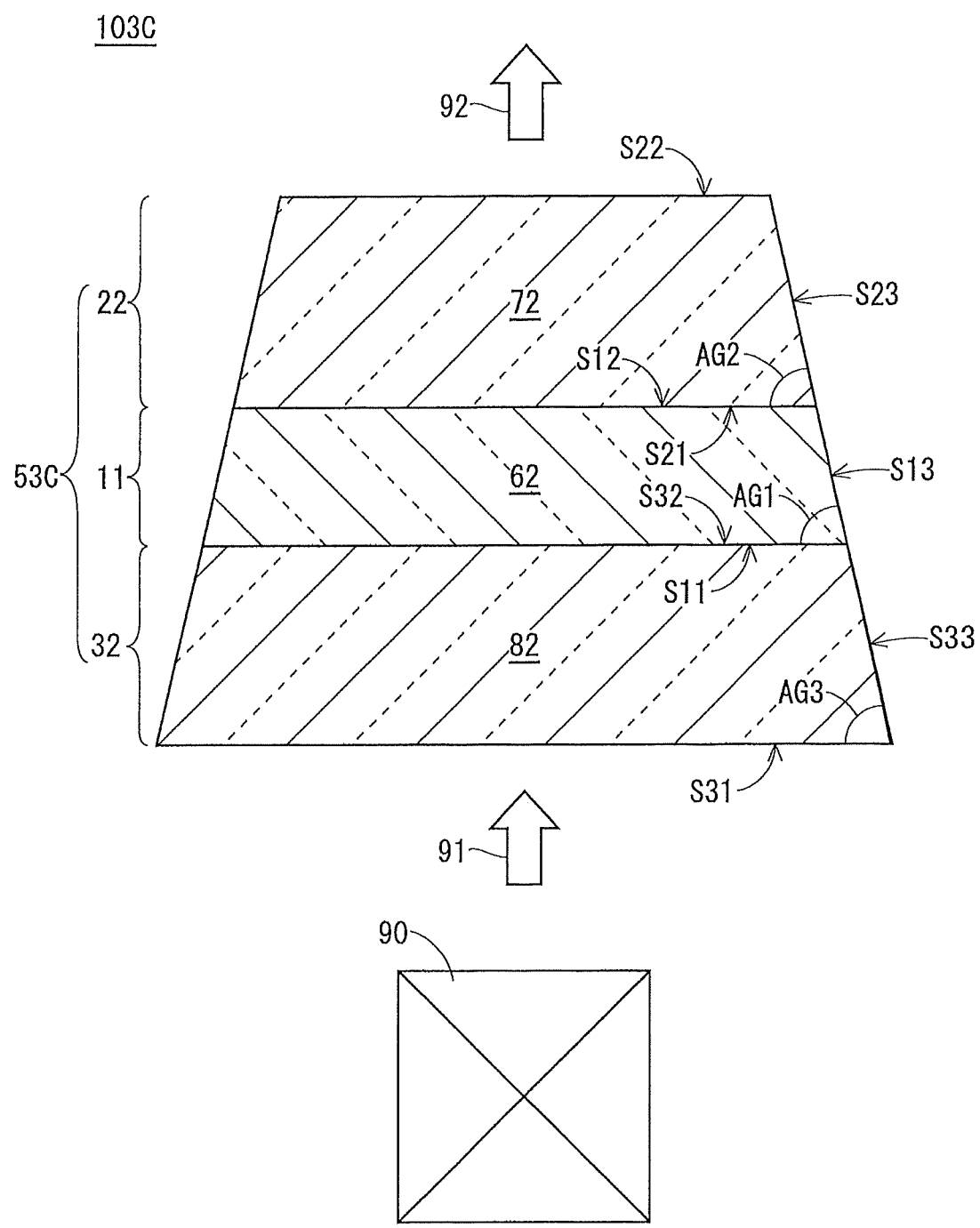
FIG. 8 is a sectional view schematically showing a configuration of an illumination device including an optic in a third modification of Embodiment 3 of the present invention.

FIG. 8 is a sectional view schematically showing a configuration of an illumination device 103C including an optic 53C in a third modification of Embodiment 3. The optic 53C includes a third substrate 32 in place of the third substrate 31 (FIG. 6). The third substrate 32 includes a substrate 82 in place of the substrate 81 (FIG. 6). As for the substrate 82, the exit surface S32 is different from the entrance surface S31 in area. Specifically, the exit surface S32 has a smaller area than the entrance surface S31. At least portion of the side surface S33 has the angle AG3 smaller than the right angle from the entrance surface S31. In other words, $0°<AG3<90°$ is satisfied. It is preferable that $AG3 \geq 45°$ be satisfied. The angle AG3 may be the same as the angle AG1 to facilitate processing. Configurations of the third substrate 32 and the substrate 82 other than the above-mentioned configuration are similar to those of the third substrate 31 and the substrate 81 described in Embodiment 1.

The coating described in Embodiment 2 or the modification thereof may be applied to Embodiment 3 or the modifications thereof. In Embodiment 3 or the modifications thereof, light is more likely to escape from the side surface than that in Embodiment 1 or the modification thereof. The effect obtained by the coating can thus become more prominent.

Embodiment 4

Figure 9:
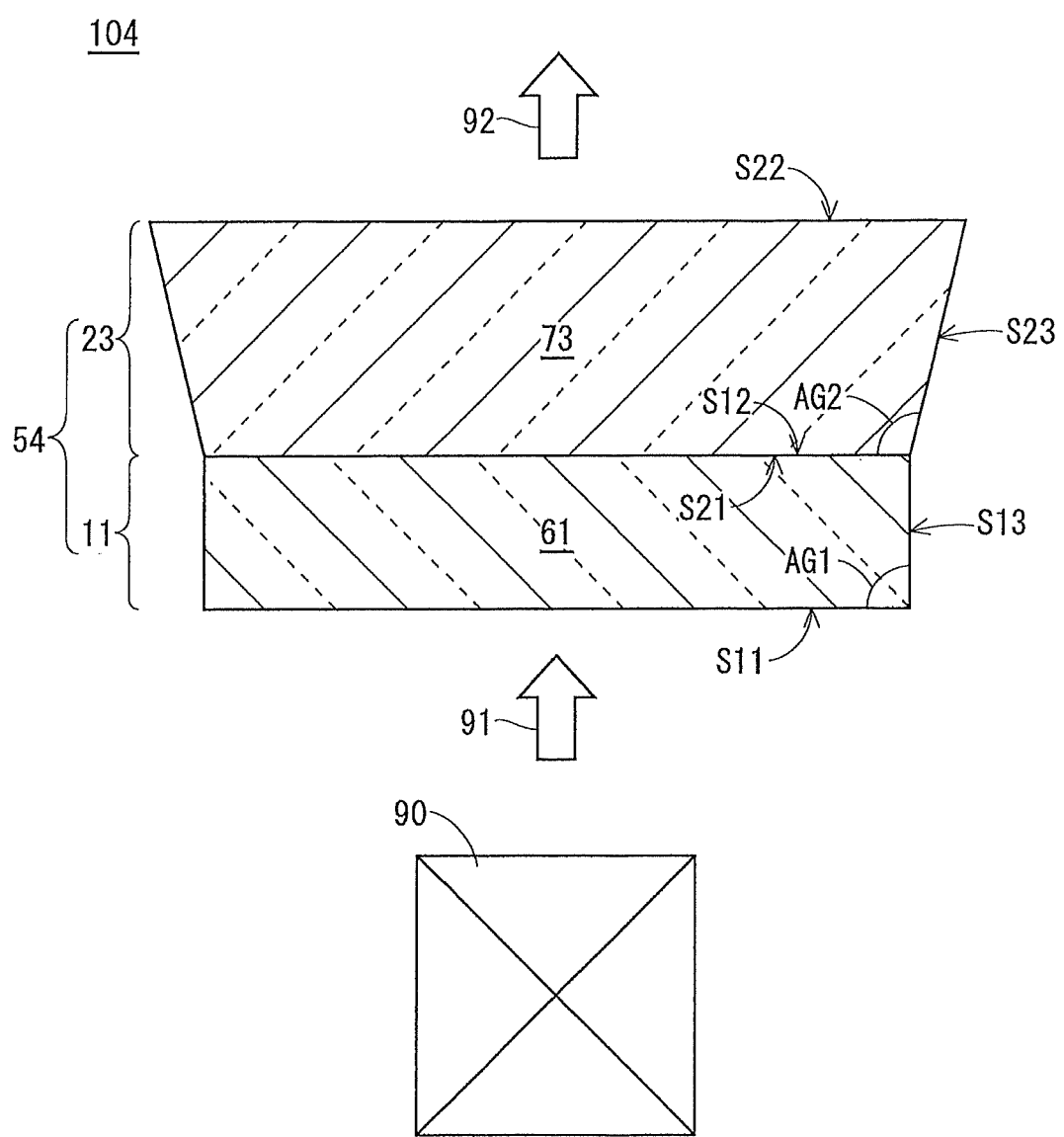
FIG. 9 is a sectional view schematically showing a configuration of an illumination device including an optic in Embodiment 4 of the present invention.

FIG. 9 is a sectional view schematically showing a configuration of an illumination device 104 including an optic 54 in Embodiment 4. The optic 54 includes a second substrate 23 in place of the second substrate 21 (FIG. 1: Embodiment 1). The second substrate 23 includes a translucent substrate 73 in place of the translucent substrate 71 (FIG. 1: Embodiment 1). As for the translucent substrate 73, the exit surface S22 is different from the entrance surface S21 in area. Specifically, the exit surface S22 has a greater area than the entrance surface S21. At least portion of the side surface S23 has the angle AG2 greater than the right angle from the entrance surface S21. In other words, $90°<AG2<180°$ is satisfied. Configurations of the second substrate 23 and the translucent substrate 73 other than the above-mentioned configuration are similar to those of the second substrate 21 and the translucent substrate 71 described in Embodiment 1.

According to the present embodiment, the translucent substrate 73 is used in place of the translucent substrate 71. This suppresses an escape of light from the side surface S23 of the translucent substrate 73. Furthermore, the illumination light 92 can be further diffused.

Figure 10:
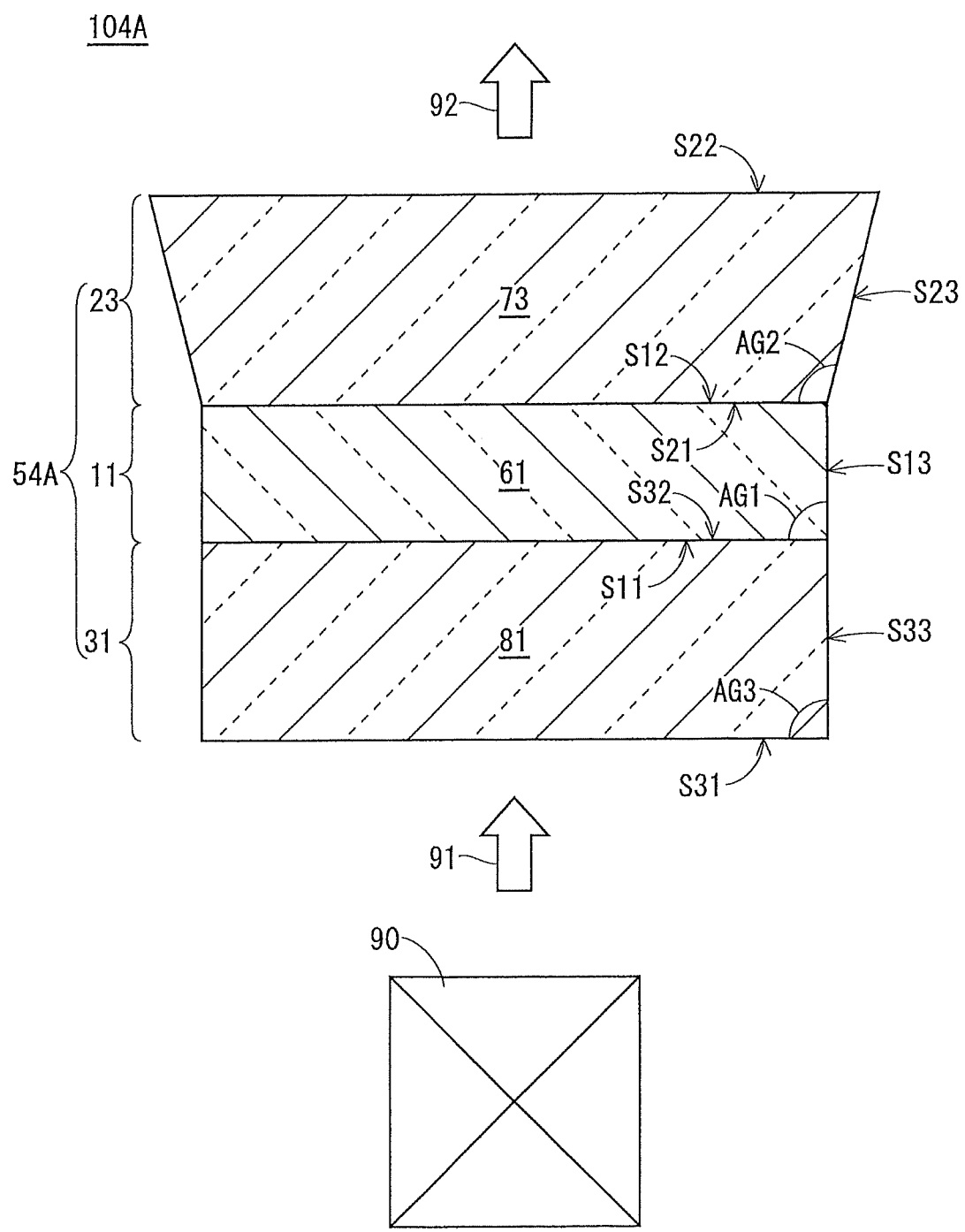
FIG. 10 is a sectional view schematically showing a configuration of an illumination device including an optic in a first modification of Embodiment 4 of the present invention.

FIG. 10 is a sectional view schematically showing a configuration of an illumination device 104A including an optic 54A in a first modification of Embodiment 4. The optic 54A includes the third substrate 31 including the substrate 81 as in the modification of Embodiment 1 shown in FIG. 2. An effect similar to the effect obtained in the modification of Embodiment 1 can thereby be obtained.

Figure 11:
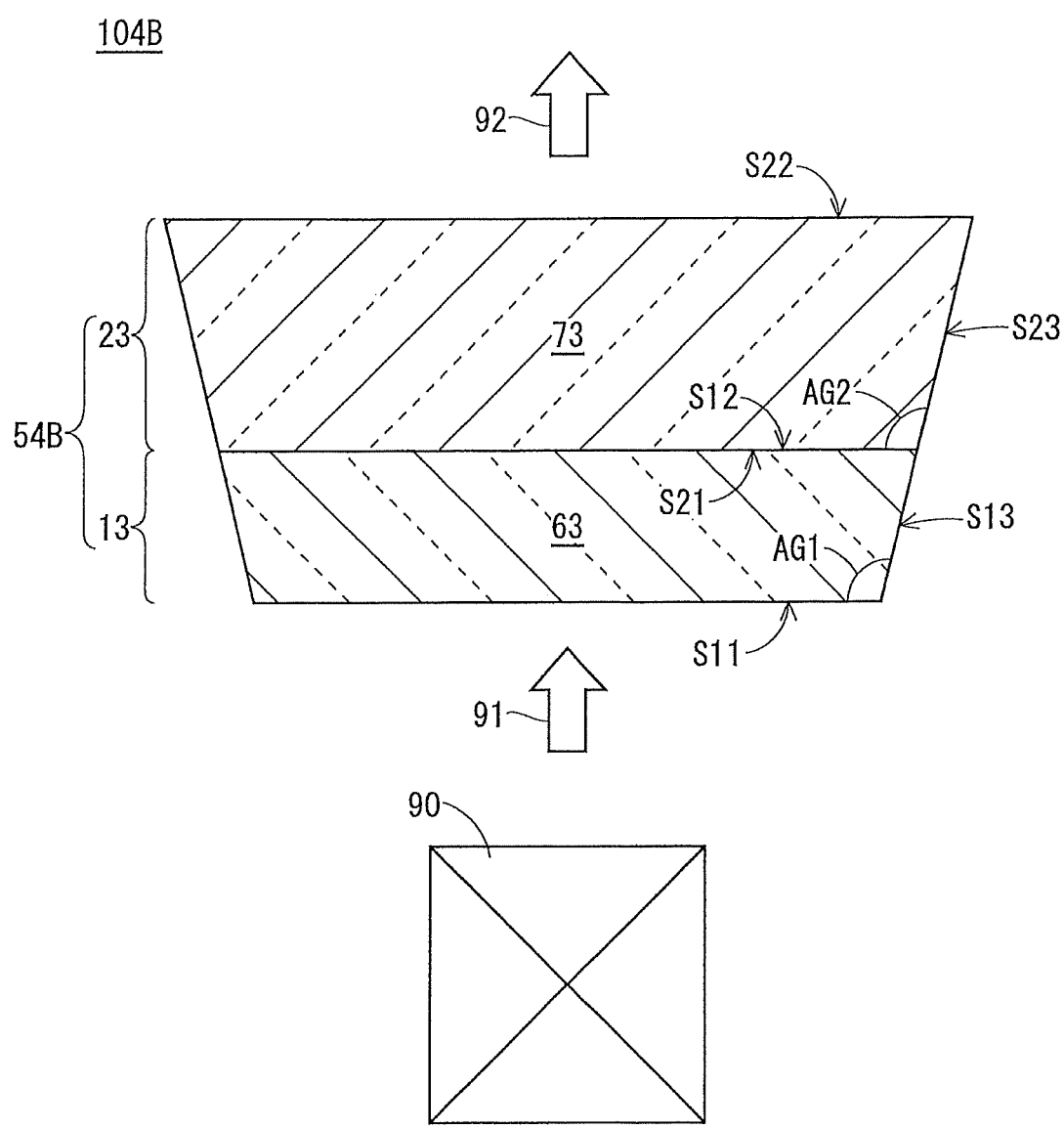
FIG. 11 is a sectional view schematically showing a configuration of an illumination device including an optic in a second modification of Embodiment 4 of the present invention.

FIG. 11 is a sectional view schematically showing a configuration of an illumination device 104B including an optic 54B in a second modification of Embodiment 4. The optic 54B includes a first substrate 13 in place of the first substrate 11 (FIG. 9). The first substrate 13 includes a fluorescent material substrate 63 in place of the fluorescent material substrate 61 (FIG. 9). As for the fluorescent material substrate 63, the exit surface S12 is different from the entrance surface S11 in area. Specifically, the exit surface S12 has a greater area than the entrance surface S11. At least portion of the side surface S13 has the angle AG1 greater than the right angle from the entrance surface S11. In other words, $90°<AG1<180°$ is satisfied. The angle AG1 may be the same as the angle AG2 to facilitate processing. Configurations of the first substrate 13 and the fluorescent material substrate 63 other than the above-mentioned configuration are similar to those of the first substrate 11 and the fluorescent material substrate 61 described in Embodiment 1. According to the present modification, an escape of light from the side surface S13 of the translucent substrate 63 is suppressed.

Figure 12:
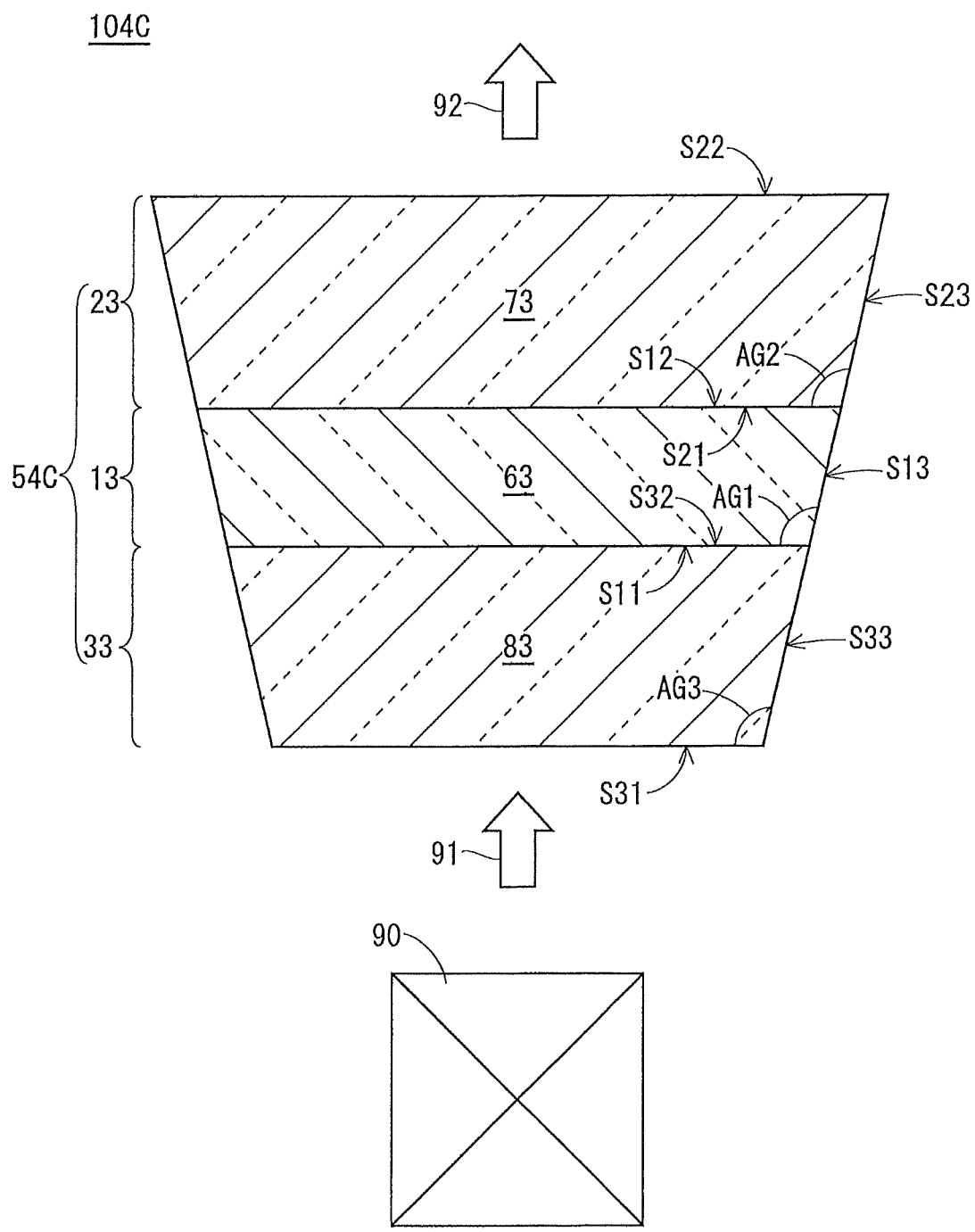
FIG. 12 is a sectional view schematically showing a configuration of an illumination device including an optic in a third modification of Embodiment 4 of the present invention.

FIG. 12 is a sectional view schematically showing a configuration of an illumination device 104C including an optic 54C in a third modification of Embodiment 4. The optic 54C includes a third substrate 33 in place of the third substrate 31 (FIG. 10). The third substrate 33 includes a substrate 83 in place of the substrate 81 (FIG. 10). As for the substrate 83, the exit surface S32 is different from the entrance surface S31 in area. Specifically, the exit surface S32 has a greater area than the entrance surface S31. At least portion of the side surface S33 has the angle AG3 greater than the right angle from the entrance surface S31. In other words, 90°<AG3<180° is satisfied. The angle AG3 may be the same as the angle AG1 to facilitate processing. Configurations of the third substrate 33 and the substrate 83 other than the above-mentioned configuration are similar to those of the third substrate 31 and the substrate 81 described in Embodiment 1. According to the present modification, an escape of light from the side surface S33 of the substrate 83 is suppressed.

The coating described in Embodiment 2 or the modification thereof may be applied to Embodiment 4 or the modifications thereof. The escape of light from the side surface is thereby further suppressed.

Embodiment 5

(Configuration)

Figure 13:
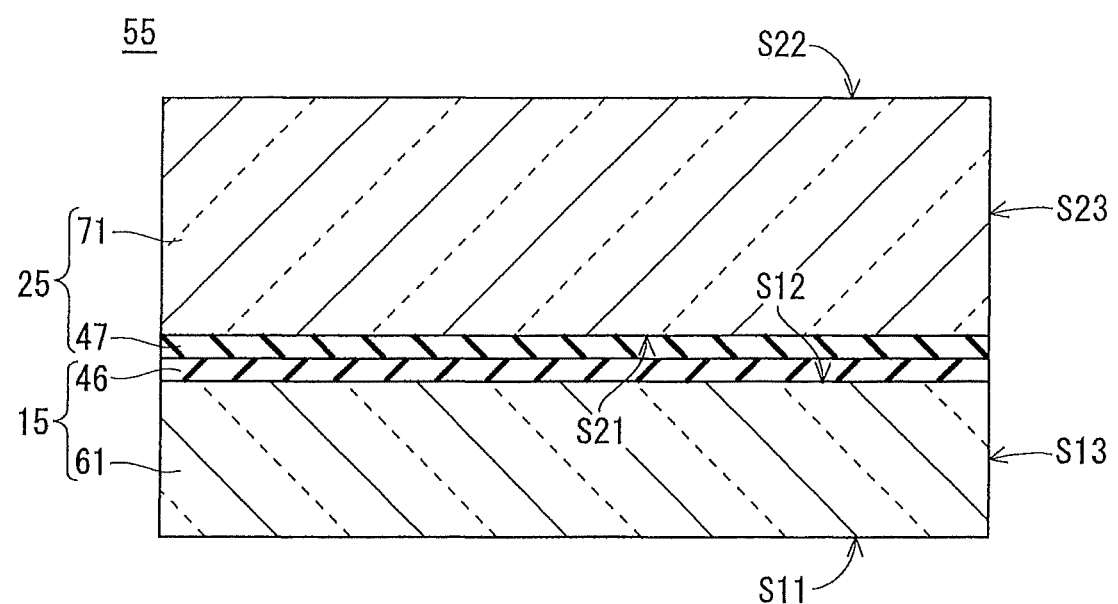
FIG. 13 is a sectional view schematically showing a configuration of an optic in Embodiment 5 of the present invention.

FIG. 13 is a sectional view schematically showing a configuration of an optic 55 in Embodiment 5. The optic 55 includes a first substrate 15 in place of the first substrate 11 (FIG. 1: Embodiment 1). The optic 55 includes a second substrate 25 in place of the second substrate 21 (FIG. 1: Embodiment 1). The first substrate 15 includes a first intermediate layer 46 in addition to the fluorescent material substrate 61 described in Embodiment 1. The first intermediate layer 46 faces the second substrate 25. The first intermediate layer 46 is translucent, and is preferably substantially transparent. The second substrate 25 includes a second intermediate layer 47 in addition to the translucent substrate 71 described in Embodiment 1. The second intermediate layer 47 faces the first substrate 15. The second intermediate layer 47 is translucent, and is preferably substantially transparent.

The first intermediate layer 46 is made of a material different from the material for the fluorescent material substrate 61. The material for the first intermediate layer 46 is preferably an oxide, and is, for example, aluminum oxide or tantalum pentoxide ($Ta_2O_5$). The second intermediate layer 47 is made of a material different from the material for the translucent substrate 71. The material for the second intermediate layer 47 is preferably an oxide, and is, for example, aluminum oxide or tantalum pentoxide ($Ta_2O_5$). The material for the first intermediate layer 46 and the material for the second intermediate layer 47 are preferably the same.

The first intermediate layer 46 preferably has a higher thermal conductivity than the fluorescent material substrate 61. The second intermediate layer 47 preferably has a higher thermal conductivity than the translucent substrate 71. The first intermediate layer 46 preferably has a thickness of 1 μm or less. The second intermediate layer 47 preferably has a thickness of 1 μm or less.

FIG. 14 is an enlarged view of a portion of FIG. 13, and is a partial sectional view schematically showing a boundary between the first substrate 15 and the second substrate 25 and a region around the boundary. The optic 55 includes a junction layer 30 disposed between the first substrate 15 and the second substrate 25 when observed microscopically under an electron microscope and the like. The junction layer 30 has an extremely small thickness to hardly prevent travel of light passing therethrough. The junction layer 30 preferably has a thickness of approximately 1 nm or more and approximately 100 nm or less, and more preferably has a thickness of 1 nm or more and 10 nm or less.

It can be said that the first substrate 15 is supported by the second substrate 25 not directly but indirectly through the junction layer 30 as seen microscopically in view of the presence at an atomic level. On the other hand, it can be said that the first substrate 15 is supported by the second substrate 25 directly as seen macroscopically because the junction layer 30 is extremely thin as described above.

The junction layer 30 is an interface layer formed between the first substrate 15 and the second substrate 25 by direct joining. Atomic diffusion occurs at direct joining, so that the junction layer 30 contains at least one element contained in a surface of the first substrate 15 facing the second substrate 25 and at least one element contained in a surface of the second substrate 25 facing the first substrate 15. In the present embodiment, the junction layer 30 contains at least one element contained in the first intermediate layer 46 and at least one element contained in the second intermediate layer 47.

Configurations other than the above-mentioned configuration are substantially the same as those in Embodiments 1 to 4 described above, so that the same components or corresponding components bear the same reference sign, and description thereof is not repeated.

(Manufacturing Method)

FIGS. 15 to 18 are sectional views schematically and respectively showing first to fourth steps of a method of manufacturing the optic 55.

Figure 15:
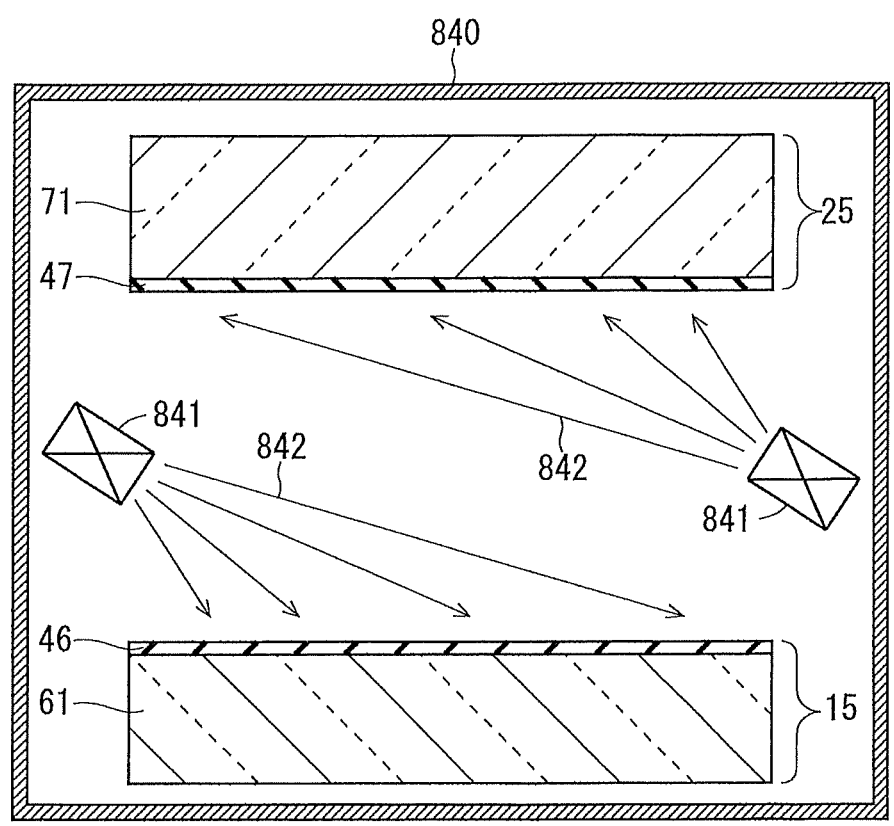
FIG. 15 is a sectional view schematically showing a first step in a method of manufacturing the optic in FIG. 13.

Referring to FIG. 15, the first intermediate layer 46 is formed on the fluorescent material substrate 61 to form the first substrate 15. The second intermediate layer 47 is formed on the translucent substrate 71 to form the second substrate 25. The first substrate 15 and the second substrate 25 are carried into a vacuum chamber 840. The surface of the first intermediate layer 46 of the first substrate 15 and the surface of the second intermediate layer 47 of the second substrate 25 are each irradiated with a particle beam 842 from a particle beam generation device 841. The surfaces thereby become suitable for direct joining. For example, the particle beam generation device 841 is an ion gun, and the particle beam 842 is an ion beam. The ion beam is typically an argon (Ar) ion beam. The surfaces may each be irradiated with plasma in place of the particle beam.

Figure 16:
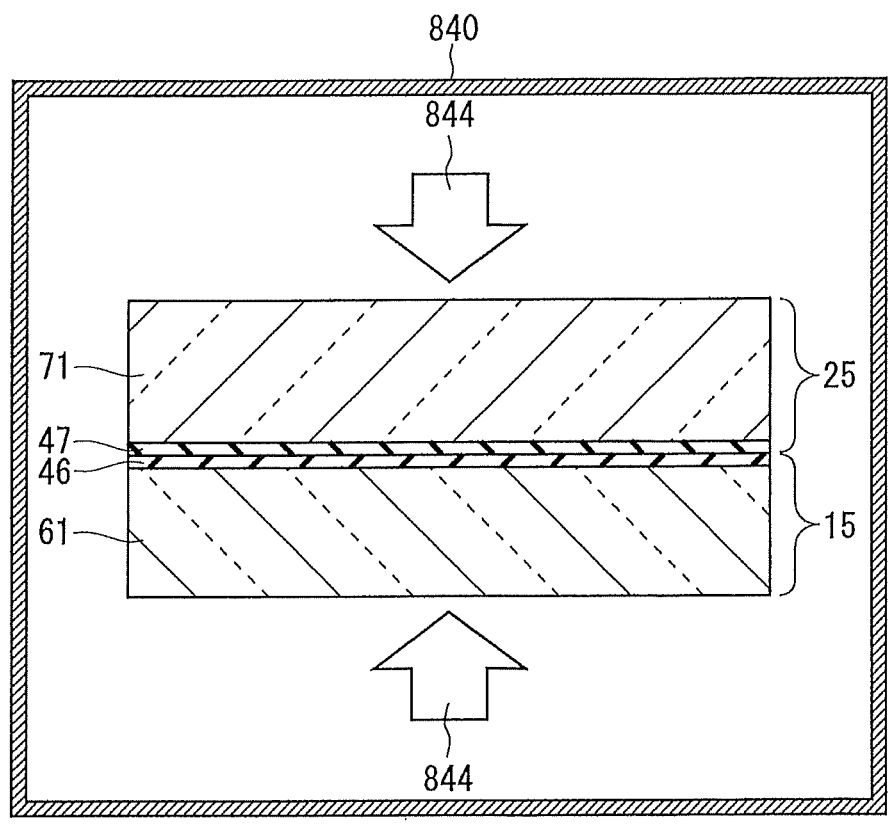
FIG. 16 is a sectional view schematically showing a second step in the method of manufacturing the optic in FIG. 13.

Referring to FIG. 16, the above-mentioned paired surfaces are brought into contact with each other. The first substrate 15 and the second substrate 25 are then pressed against each other by a load 844. The first substrate 15 and the second substrate 25 are thereby joined to each other by direct joining. They may be joined at room temperature or temperature higher than the room temperature. The use of a high temperature, in particular, a temperature of approximately 800° C. or more particularly significantly promotes diffusion of substances. Smoothness of the surfaces to be joined is thus not strictly required compared with a case at the room temperature. The use of the high temperature at joining can reduce cost, and increase yield if it is allowed.

Figure 18:
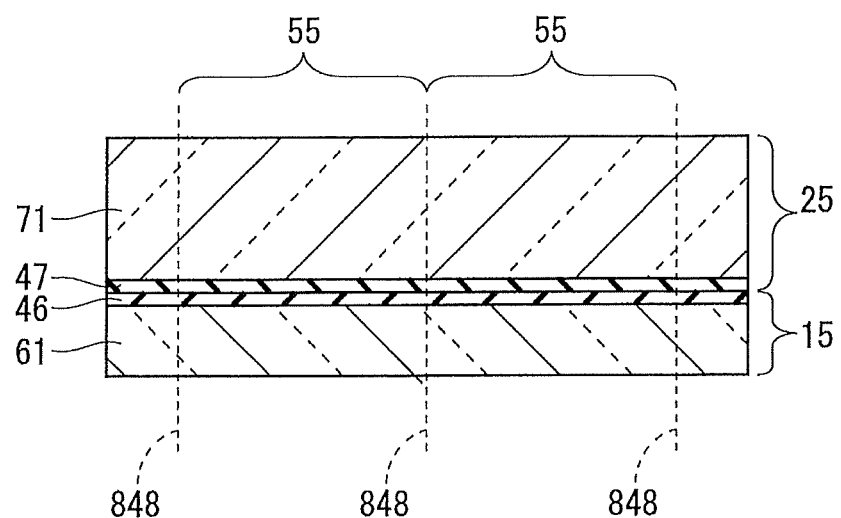
FIG. 18 is a sectional view schematically showing a fourth step in the method of manufacturing the optic in FIG. 13.

Referring to FIG. 17, the thickness of the fluorescent material substrate 61 may be reduced by polishing 846 as appropriate. Referring to FIG. 18, one or more optics 55 are cut out of a stack of the first substrate 15 and the second substrate 25 obtained by joining described above along dicing lines 848. The optics 55 are thereby obtained.

(Effects)

According to the present embodiment, effects substantially similar to the effects obtained in Embodiments 1 to 4 described above can be obtained. An effect described below can further be obtained.

The material for the surface of the first substrate 15 facing the second substrate 25 can become suitable for joining by providing the first intermediate layer 46. This facilitates joining, and, in particular, facilitates direct joining for which a combination of materials is important. The material for the first intermediate layer 46 may be the same as the material for the surface of the second substrate 25 facing the first substrate 15, and, in this case, direct joining is further facilitated.

The material for the surface of the second substrate 25 facing the first substrate 15 can become suitable for joining by providing the second intermediate layer 47. This facilitates joining, and, in particular, facilitates direct joining for which the combination of materials is important. The material for the second intermediate layer 47 may be the same as the material for the surface of the first substrate 15 facing the second substrate 25, and, in this case, direct joining is further facilitated.

(Modifications)

FIG. 19 is a partial sectional view schematically showing a configuration of an optic 55A in a first modification of Embodiment 5 in a similar view to that of FIG. 14. The optic 55A is obtained by performing the above-mentioned manufacturing method without forming the second intermediate layer 47 (FIG. 14). The present modification is particularly suitable in a case where the first intermediate layer 46 and the translucent substrate 71 are made of the same material (e.g., aluminum oxide).

Figure 20:
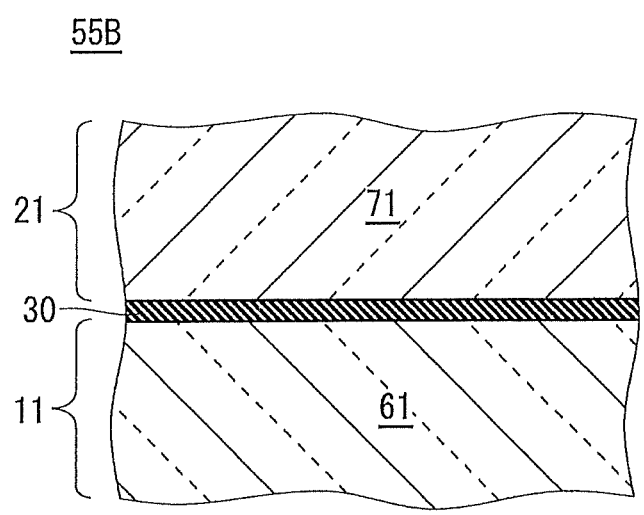
FIG. 20 is a partial sectional view schematically showing a configuration of an optic in a second modification of Embodiment 5 of the present invention in a similar view to that of FIG. 14.

FIG. 20 is a partial sectional view schematically showing a configuration of an optic 55B in a second modification of Embodiment 5 in a similar view to that of FIG. 14. The optic 55B is obtained by performing the above-mentioned manufacturing method without forming the first intermediate layer 46 and the second intermediate layer 47 (FIG. 14).

EXAMPLES

Manufacturing conditions of optics of Examples 1 to 7 and Comparative Examples 1 to 5 will be described first, and then results of evaluation thereof will be shown in tables and described below.

(Manufacturing Conditions of Examples 1 to 4)

The optics of Examples 1 to 4 macroscopically corresponding to the optic in FIG. 5 (Embodiment 3) were manufactured as described below.

As the fluorescent material substrate, a polycrystalline YAG ceramic substrate doped with Ce atoms and having a thickness of 0.3 mm (from Konoshima Chemical Co., Ltd.) was prepared. As the first intermediate layer, an alumina layer having a thickness of 0.5 µm was formed on the substrate by sputtering. The alumina layer was polished to have a surface roughness Ra of 0.1 nm by chemical mechanical polishing (CMP). The first substrate was formed as described above.

As the translucent substrate, an oriented polycrystalline aluminum nitride substrate having a thickness of 1 mm was prepared. Degrees of orientation of the polycrystalline structures of Examples 1, 2, 3, and 4 were respectively 30%, 50%, 70% and 85%. As the second intermediate layer, an alumina layer having a thickness of 0.5 µm was formed on the substrate by sputtering. The alumina layer was polished to have a surface roughness Ra of 0.1 nm by chemical mechanical polishing (CMP). The second substrate was formed as described above.

Next, the alumina layer of the first substrate and the alumina layer of the second substrate were joined to each other by direct joining. Specifically, the surfaces of the alumina layers were each first irradiated with the argon ion beam. Next, they were brought into contact with each other in a vacuum at room temperature, and were subjected to a load. That is to say, direct joining was performed. No air bubbles were observed at a junction surface under a microscope.

Next, a 3 mm square optic was cut out using a dicing device. Furthermore, multistage grooving in which the depth of a cut was gradually changed was performed only on the aluminum nitride substrate using a dicing device having a blade #800 having a width of 100 µm. A tapered shape corresponding to the angle AG2 (FIG. 5)=63° was thereby formed. In this case, the exit surface of the aluminum nitride substrate had a dimension of 2 mm×2 mm. The obtained optic had no chipping or cracking.

(Manufacturing Conditions of Comparative Example 1)

As the translucent substrate, an unoriented polycrystalline aluminum nitride substrate was prepared. The substrate was manufactured by sintering at normal pressure, and had an in-line transmittance of 1%. The optic of Comparative Example 1 was manufactured using the translucent substrate while using conditions similar to those of Examples 1 to 4 described above as the other conditions.

(Manufacturing Conditions of Comparative Example 2)

As the translucent substrate, a sapphire substrate having the monocrystalline structure was prepared. The optic of Comparative Example 2 was manufactured using the translucent substrate while using conditions similar to those of Examples 1 to 4 described above as the other conditions.

(Manufacturing Conditions of Comparative Example 3)

An optic not including the translucent substrate was manufactured as the optic of Comparative Example 3. Specifically, a 3 mm square fluorescent material substrate similar to the fluorescent material substrates of Examples 1 to 4 was cut out.

(Manufacturing Conditions of Example 5)

The steps before dicing were performed using conditions similar to those of Example 4 described above. Next, a resist was applied to the exit surface of the translucent substrate for protection. Next, dicing was performed in a similar manner to that of Example 4. Next, as the coating (the dielectric film and the reflective film) over the side surface of the optic, an alumina layer having a thickness of 0.5 µm and an aluminum alloy film having a thickness of 0.5 µm were formed by sputtering. Next, the resist was removed using an organic solvent. The optic of Example 5 was manufactured as described above.

(Manufacturing Conditions of Example 6)

Dicing was performed using conditions similar to those of Example 4 described above so that a reverse tapered shape corresponding to the angle AG2 (FIG. 10)=117° was formed. The optic of Example 6 was thereby manufactured. The obtained optic had no chipping or cracking. The exit surface of the translucent substrate had a dimension of 4 mm×4 mm, and the fluorescent material substrate had a dimension of 3 mm×3 mm.

(Manufacturing Conditions of Example 7)

The steps before dicing were performed using conditions similar to those of Example 6. Next, a resist was applied to the exit surface of the translucent substrate for protection. Next, dicing was performed in a similar manner to that of Example 6. Next, as the coating (the dielectric film and the reflective film) over the side surface of the optic, an alumina layer having a thickness of 0.5 μm and an aluminum alloy film having a thickness of 0.5 μm were formed by sputtering. Next, the resist was removed using an organic solvent. The optic of Example 7 was manufactured as described above.

(Manufacturing Conditions of Comparative Example 4)

As the translucent substrate, an unoriented polycrystalline aluminum nitride substrate was prepared. The substrate was manufactured by sintering at normal pressure, and had an in-line transmittance of 1%. The optic of Comparative Example 4 was manufactured using the translucent substrate while using conditions similar to those of Example 7 described above as the other conditions.

(Manufacturing Conditions of Comparative Example 5)

As the translucent substrate, a sapphire substrate having the monocrystalline structure was prepared. The optic of Comparative Example 5 was manufactured using the translucent substrate while using conditions similar to those of Example 7 described above as the other conditions.

(Evaluation Method)

A GaN-based blue laser device having an output of 10 W and a wavelength of 450 nm was prepared as the light source. The optics were each irradiated with the excitation light generated using the device. Output, color non-uniformity, and the size of the illumination light obtained by the light passing through each of the optics were evaluated.

The output of the illumination light was measured in accordance with the regulations of "JIS C 7801" of Japanese Industrial Standards (JIS). Specifically, the output was measured by a time average of a total luminous flux from each of the optics. The total luminous flux was measured using an integrating sphere (a sphere photometer). The light source to be measured and a standard light source to which the total luminous flux was valued were turned on at the same location, and were compared with each other for measurement.

Color non-uniformity of the illumination light was evaluated by a chromaticity diagram obtained using a luminance distribution measurement device. The illumination light was determined not to have color non-uniformity in a case where results of measurement were in a range of a median value x of 0.3447±0.005 and y of 0.3553±0.005 in the chromaticity diagram, and was determined to have color non-uniformity in the other cases.

The size of the illumination light was a dimension along each of the width and the height, and was calculated based on light intensity distribution of the illumination light. In the calculation, the location at which light intensity was $P_k/e^2$ was considered as the location of an outer edge of the illumination light, where $P_k$ was the peak of light intensity. The light intensity distribution was measured using a near-field measuring instrument from Ophir Optronics Solutions Ltd.

(Results of Evaluation of Examples 1 to 4 and Comparative Examples 1 to 3)

Results of evaluation of Examples 1 to 4 and Comparative Examples 1 to 3 are shown in a table below.

TABLE 3

| | | EXAMPLE 1 | EXAMPLE 2 | EXAMPLE 3 | EXAMPLE 4 | COMPARATIVE EXAMPLE 1 | COMPARATIVE EXAMPLE 2 | COMPARATIVE EXAMPLE 3 |
|---|---|---|---|---|---|---|---|---|
| TRANSLUCENT SUBSTRATE | MATERIAL | ALUMINUM NITRIDE | | | | | SAPPHIRE | NOT INCLUDED |
| | CRYSTAL | POLYCRYSTAL | | | | | MONO-CRYSTAL | — |
| | ORIENTATION | ORIENTED | | | | UNORIENTED | ORIENTED | — |
| | DEGREE OF ORIENTATION [%] | 30 | 50 | 70 | 85 | 0 | 100 | — |
| | IN-LINE TRANSMITTANCE [%] | 8 | 15 | 30 | 60 | 1 | 85 | 100 |
| | SIDE SURFACE ANGLE [%] | 63 | | | | | | — |
| | SIDE SURFACE COATING | NOT DISPOSED | | | | | | |
| RESULTS OF MEASUREMENT OF ILLUMINATION LIGHT | OUTPUT [lm] | 900 | 1000 | 1100 | 1200 | 200 | 1000 | 900 |
| | COLOR NON-UNIFORMITY | NOT CAUSED | NOT CAUSED | NOT CAUSED | NOT CAUSED | NOT CAUSED | CAUSED | CAUSED |
| | SIZE [mm] | 2.3 | 2.3 | 2.3 | 2.3 | 2.3 | 2.3 | 3.5 |

Each of Examples 1 to 4 had an output of 900 [lm] or more without color non-uniformity. The output increased with increasing degree of orientation. An output of 200 [lm] of Comparative Example 1 was significantly lower than the outputs of Examples 1 to 4. The illumination light of each of Comparative Examples 2 and 3 had color non-uniformity. An output of 900 [lm] of Comparative Example 3 was equal to or lower than the outputs of Examples 1 to 4.

The size of the illumination light of each of Examples 1 to 4 and Comparative Examples 1 and 2 was 2.3 mm, and was slightly greater than a size of the exit surface of the translucent substrate of 2.0 mm. A size of the illumination light of Comparative Example 3 of 3.5 mm was greater than that of each of Examples 1 to 4. In other words, the illumination light of each of Examples 1 to 4 was focused compared with that of Comparative Example 3 not including the translucent substrate.

(Results of Evaluation of Examples 4 to 7 and Comparative Examples 4 and 5)

Results of evaluation of Examples 4 to 7 and Comparative Examples 4 and 5 are shown in a table below. The result of evaluation of Example 4 is the same as that shown in the above-mentioned table.

TABLE 4

| | | EXAMPLE 4 | EXAMPLE 5 | EXAMPLE 6 | EXAMPLE 7 | COMPARATIVE EXAMPLE 4 | COMPARATIVE EXAMPLE 5 |
|---|---|---|---|---|---|---|---|
| TRANSLUCENT SUBSTRATE | MATERIAL | ALUMINUM NITRIDE POLYCRYSTAL | | | | | SAPPHIRE MONOCRYSTAL |
| | CRYSTAL ORIENTATION | ORIENTED | | | | UNORIENTED | ORIENTED |
| | DEGREE OF ORIENTATION [%] | 85 | | | | 0 | 100 |
| | IN-LINE TRANSMITTANCE [%] | 60 | | | | 1 | 85 |
| | SIDE SURFACE ANGLE [°] | 63 | | | | 117 | |
| | SIDE SURFACE COATING | NOT DISPOSED | DISPOSED | NOT DISPOSED | DISPOSED | NOT DISPOSED | |
| RESULTS OF MEASUREMENT OF ILLUMINATION LIGHT | OUTPUT [lm] | 1200 | 1400 | 1400 | 1600 | 300 | 1000 |
| | COLOR NON-UNIFORMITY | NOT CAUSED | NOT CAUSED | NOT CAUSED | NOT CAUSED | NOT CAUSED | CAUSED |
| | SIZE [mm] | 2.3 | 2.0 | 4.3 | 4.0 | 4.3 | 4.3 |

Each of Examples 4 to 7 had an output of 1000 [lm] or more without color non-uniformity. An output of 300 [lm] of Comparative Example 4 was significantly lower than the outputs of Examples 4 to 7. The illumination light of Comparative Example 5 had color non-uniformity.

The size of the illumination light of Example 4 of 2.3 mm was slightly greater than the size of the exit surface of the translucent substrate of 2.0 mm. A size of the illumination light of Example 5 of 2.0 mm was the same as the size of the exit surface of the translucent substrate of 2.0 mm. A size of the illumination light of each of Example 6 and Comparative Examples 4 and 5 of 4.3 mm was slightly greater than a size of the exit surface of the translucent substrate of 4.0 mm. A size of the illumination light of Example 7 of 4.0 mm was the same as the size of the exit surface of the translucent substrate of 4.0 mm.

Under a forward tapered condition with a side surface angle of 63° (the angle AG2 (FIG. 5)=63°), an output of the illumination light of Example 5 having the side surface coating of 1400 [lm] was higher than an output of the illumination light of Example 4 not having the side surface coating of 1200 [lm]. Under a reverse tapered condition with a side surface angle of 117° (the angle AG2 (FIG. 10)=117°), an output of the illumination light of Example 7 having the side surface coating of 1600 [lm] was higher than an output of the illumination light of Example 6 not having the side surface coating of 1400 [lm].

Under the condition without the side surface coating, the output of Example 6 including the translucent substrate having the reverse tapered shape of 1400 [lm] was higher than the output of Example 4 including the translucent substrate having the tapered shape of 1200 [lm]. Under the condition with the side surface coating, the output of Example 7 including the translucent substrate having the reverse tapered shape of 1600 [lm] was higher than the output of Example 5 including the translucent substrate having the tapered shape of 1400 [lm].

Under the condition with the side surface angle of 63°, the size of the illumination light of Example 5 having the side surface coating of 2.0 mm was smaller than the size of the illumination light of Example 4 not having the side surface coating of 2.3 mm. Under the condition with the side surface angle of 117°, the size of the illumination light of Example 7 having the side surface coating of 4.0 mm was smaller than the size of the illumination light of Example 6 not having the side surface coating of 4.3 mm.

Under the condition without the side surface coating, the size of the illumination light of Example 6 including the translucent substrate having the reverse tapered shape of 4.3 mm was greater than the size of the illumination light of Example 4 including the translucent substrate having the tapered shape of 2.3 mm. Under the condition with the side surface coating, the size of the illumination light of Example 7 including the translucent substrate having the reverse tapered shape of 4.0 mm was greater than the size of the illumination light of Example 5 including the translucent substrate having the tapered shape of 2.0 mm. The size of the illumination light of Example 7 including the translucent substrate having the reverse tapered shape of 4.0 mm was greater than the size of the illumination light of Comparative Example 3 not including the translucent substrate of 3.5 mm described above.

While the invention has been described in detail, the foregoing description is in all aspects illustrative and not restrictive. It is understood that numerous modifications not having been described can be devised without departing from the scope of the present invention.

EXPLANATION OF REFERENCE SIGNS

AG1, AG2, AG3 angle
S11, S21, S31 entrance surface
S12, S22, S32 exit surface
S13, S23, S33 side surface
11-13, 15 first substrate
21-23, 25 second substrate
30 junction layer
31-33 third substrate
41 dielectric film
42 reflective film
46 first intermediate layer
47 second intermediate layer
51, 51A, 52, 52A, 53, 53A-53C, 54, 54A-54C, 55, 55A, 55B optic
61-63 fluorescent material substrate
71-73 translucent substrate
81-83 substrate
90 light source
91 excitation light
92 illumination light
101, 101A, 102, 102A, 103, 103A, 103B, 103C, 104, 104A, 104B, 104C illumination device

The invention claimed is:

1. An optic to convert wavelength of light from a light source, comprising:
   a first substrate including a fluorescent material substrate; and
   a second substrate to support the first substrate, wherein the second substrate includes a translucent substrate to receive light from the light source through the first substrate, the translucent substrate having an oriented polycrystalline structure to have a crystalline anisotropy in refractive index.

2. The optic according to claim 1, wherein the polycrystalline structure of the translucent substrate has a degree of orientation of 10% or more and 99.5% or less.

3. The optic according to claim 1, wherein the translucent substrate has a higher refractive index than the fluorescent material substrate.

4. The optic according to claim 1, wherein the translucent substrate has a higher thermal conductivity than the fluorescent material substrate.

5. The optic according to claim 1, wherein a coefficient of linear expansion of the translucent substrate is within ±50% of a coefficient of linear expansion of the fluorescent material substrate.

6. The optic according to claim 1, wherein the translucent substrate is made of aluminum nitride or aluminum oxide.

7. The optic according to claim 1, wherein the fluorescent material substrate has a polycrystalline structure.

8. The optic according to claim 1, wherein the translucent substrate has an entrance surface to receive the light from the light source through the first substrate, an exit surface opposite the entrance surface, and a side surface to connect the entrance surface and the exit surface to each other.

9. The optic according to claim 8, further comprising a dielectric film disposed over the side surface of the translucent substrate and having a lower refractive index than the translucent substrate.

10. The optic according to claim 8, further comprising a reflective film disposed directly or indirectly over the side surface of the translucent substrate.

11. The optic according to claim 8, wherein the exit surface is different from the entrance surface in area.

12. The optic according to claim 8, wherein at least portion of the side surface has an angle smaller than a right angle from the entrance surface.

13. The optic according to claim 8, wherein at least portion of the side surface has an angle greater than a right angle from the entrance surface.

14. The optic according to claim 1, further comprising a junction layer disposed between the first substrate and the second substrate, the junction layer containing at least one element contained in a surface of the first substrate facing the second substrate and at least one element contained in a surface of the second substrate facing the first substrate.

15. The optic according to claim 1, wherein the first substrate includes a first intermediate layer facing the second substrate, the first intermediate layer being made of a material different from a material for the fluorescent material substrate.

16. The optic according to claim 1, wherein the second substrate includes a second intermediate layer facing the first substrate, the second intermediate layer being made of a material different from a material for the translucent substrate.

17. An illumination device comprising:
   a light source; and
   an optic to convert wavelength of light from the light source, wherein
   the optic includes:
   a first substrate including a fluorescent material substrate; and
   a second substrate to support the first substrate, and
   the second substrate includes a translucent substrate to receive the light from the light source through the first substrate, the translucent substrate having an oriented polycrystalline structure to have a crystalline anisotropy in refractive index.

18. The illumination device according to claim 17, wherein the light source includes a laser.

* * * * *